US012676987B2

(12) United States Patent
Foessel et al.

(10) Patent No.: US 12,676,987 B2
(45) Date of Patent: Jul. 7, 2026

(54) CODED VIDEO TRANSMISSION CONCEPT

(71) Applicant: Fraunhofer-Gesellschaft zur Foerderung der angewandten Forschung e.V., Munich (DE)

(72) Inventors: Siegfried Foessel, Erlangen (DE); Thomas Richter, Erlangen (DE); Wolfgang Heppner, Erlangen (DE); Christian Scherl, Erlangen (DE); Christian Minuth, Erlangen (DE); Bilal Ahmed, Erlangen (DE); Nisha Bhaskar, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 151 days.

(21) Appl. No.: 18/453,796

(22) Filed: Aug. 22, 2023

(65) Prior Publication Data

US 2025/0030873 A1     Jan. 23, 2025

Related U.S. Application Data

(60) Provisional application No. 63/527,254, filed on Jul. 17, 2023.

(51) Int. Cl.
   H04N 19/159       (2014.01)
   H04N 19/154       (2014.01)
(52) U.S. Cl.
   CPC ......... H04N 19/159 (2014.11); H04N 19/154 (2014.11)

(58) Field of Classification Search
None
See application file for complete search history.

(56) References Cited

U.S. PATENT DOCUMENTS

| | | | |
|---|---|---|---|
| 6,188,728 B1 * | 2/2001 | Hurst | H04N 19/51 |
| | | | 375/E7.211 |
| 9,961,340 B2 * | 5/2018 | Zhang | H04N 17/004 |
| 11,165,848 B1 * | 11/2021 | Larson | H04N 19/154 |

(Continued)

OTHER PUBLICATIONS

AAPM On-Line Report 3, 2005, http://dx.doi.org/10.1118/1.1861159 "Assessment of Display Performance for Medical Imaging Systems" (22 pages).

(Continued)

*Primary Examiner* — Stefan Gadomski
(74) *Attorney, Agent, or Firm* — PERKINS COIE LLP; Michael A. Glenn

(57) ABSTRACT

A video encoder, decoder, system, and method for coding a video are presented. The video encoder for encoding a video is configured to encode frames of the video using intra coding and differential inter-frame coding into a data stream, measure a quality loss resulting from coding loss, and signal, as side information, information on the quality loss in the data stream. Further is presented a video decoder configured to decode frames of the video using intra decoding and differential inter-frame decoding from a data stream into which the video is encoded at a coding loss, estimate information on a quality loss resulting from the coding loss, and output, at an output interface of the video decoder, meta data revealing the information on the picture loss, and/or modify a reconstructed version of the video.

29 Claims, 8 Drawing Sheets

100

102   encode frames of a video using intra coding and differential inter-frame coding into a data stream 104   measure a quality loss resulting from coding loss 106   signal, as side information, information on the quality loss in the data stream

(56) References Cited

U.S. PATENT DOCUMENTS

| | | | | | |
|---|---|---|---|---|---|
| 2003/0081676 | A1* | 5/2003 | Lin | | H04N 19/40 |
| | | | | | 375/E7.176 |
| 2003/0112996 | A1* | 6/2003 | Holliman | | H04N 17/004 |
| | | | | | 375/E7.146 |
| 2010/0119164 | A1 | 5/2010 | Singhal et al. | | |
| 2014/0301460 | A1* | 10/2014 | Karczewicz | | H04N 19/18 |
| | | | | | 375/240.12 |
| 2015/0092860 | A1* | 4/2015 | Benight | | H04N 19/48 |
| | | | | | 375/240.18 |
| 2015/0350595 | A1* | 12/2015 | Chen | | H04N 19/62 |
| | | | | | 348/724 |
| 2016/0353131 | A1* | 12/2016 | Kim | | H04N 19/154 |
| 2017/0201745 | A1* | 7/2017 | Abramov | | H04N 23/64 |
| 2017/0237988 | A1* | 8/2017 | Nogues | | G06F 1/3296 |
| | | | | | 375/240.02 |
| 2018/0176577 | A1* | 6/2018 | Puri | | H04N 19/196 |
| 2018/0376153 | A1* | 12/2018 | Gokhale | | H04N 19/147 |
| 2021/0084339 | A1* | 3/2021 | Alakuijala | | H04N 19/124 |
| 2022/0086466 | A1* | 3/2022 | Holland | | H04N 19/176 |
| 2022/0159311 | A1* | 5/2022 | Meardi | | H04N 19/186 |
| 2022/0321918 | A1 | 10/2022 | He et al. | | |
| 2022/0400263 | A1* | 12/2022 | Henry | | H04N 19/176 |
| 2023/0056436 | A1* | 2/2023 | He | | H04N 19/159 |
| 2024/0244227 | A1* | 7/2024 | Ram | | H04N 19/172 |
| 2024/0331122 | A1* | 10/2024 | Gao | | G06T 7/0002 |
| 2025/0280129 | A1* | 9/2025 | Pellegrin | | H04N 19/176 |

OTHER PUBLICATIONS

Foessel and T. Richter, "Proposed Extensions to the Third Edition of JPEG XS (ISO/IEC 21122) Standard," in SMPTE Motion Imaging Journal, vol. 132, No. 4, pp. 26-32, May 2023, doi: 10.5594/JMI.2023.3261399.

IEC 62563-2, "Medical electrical equipment—Medical image display systems—Part 2: Acceptance and constancy tests for medical image displays", Nov. 10, 2021 (76 pages).

SO/IEC DIS 21122-1 Ed. 3, Information technology—JPEG XS low-latency lightweight image coding system—Part 1: Core coding system, Apr. 2023 (148 pages).

Wang: "Gradual Decoder Refresh Using Isolated Regions", 3. JVT Meeting; 60. MPEG Meeting; Jun. 5, 2002-Oct. 5, 2002; Fairfax, US;, (Joint Video Team of ISO/IEC JTC1/SC29/WG11 and ITU-T SG.16 ),, No. JVT-C074; JVT-C074, May 10, 2002 (May 10, 2002), XP030005183, section 2—19 pages.

Browne A et al: Algorithm description for Versatile Video Coding and Test Model 18 (VTM 18)11 , 28., JVET Meeting; Oct. 20, 2022-Oct. 28, 2022; Mainz; (The Joint Video Exploration Team of ISO/IEC JTC1/SC29/WG11 and ITU-T SG.16) , No. JVET-AB2002 ; m61497 Feb. 20, 2023 (Feb. 20, 2023), XP030308366—134 pages.

Zhengyou Wang et al: "No-reference image quality assessment for compressed images based on DCT coefficient distribution and PSNR estimation",, Signal&Information Processing Association Annual Summit and Conference (APSIPA ASC), 2012 Asia-Pacific, IEEE, Dec. 3, 2012 (Dec. 3, 2012), pp. 1-4, XP032309962, ISBN: 978-1-4673-4863-8 section III—4 pages.

He {Qualcomm) Y et al: "AHG9: Picture quality metrics SEI message", 22. JVET Meeting; Apr. 20, 2021-Apr. 28, 2021;, Teleconference; (The Joint Video Exploration Team of ISO/IEC JTC1/SC29/WG11 and ITU-T SG.16 ), No. JVET-V0062;m56457 Apr. 27, 2021 (Apr. 27, 2021), XP030294081—5 pages.

* cited by examiner 14a    46
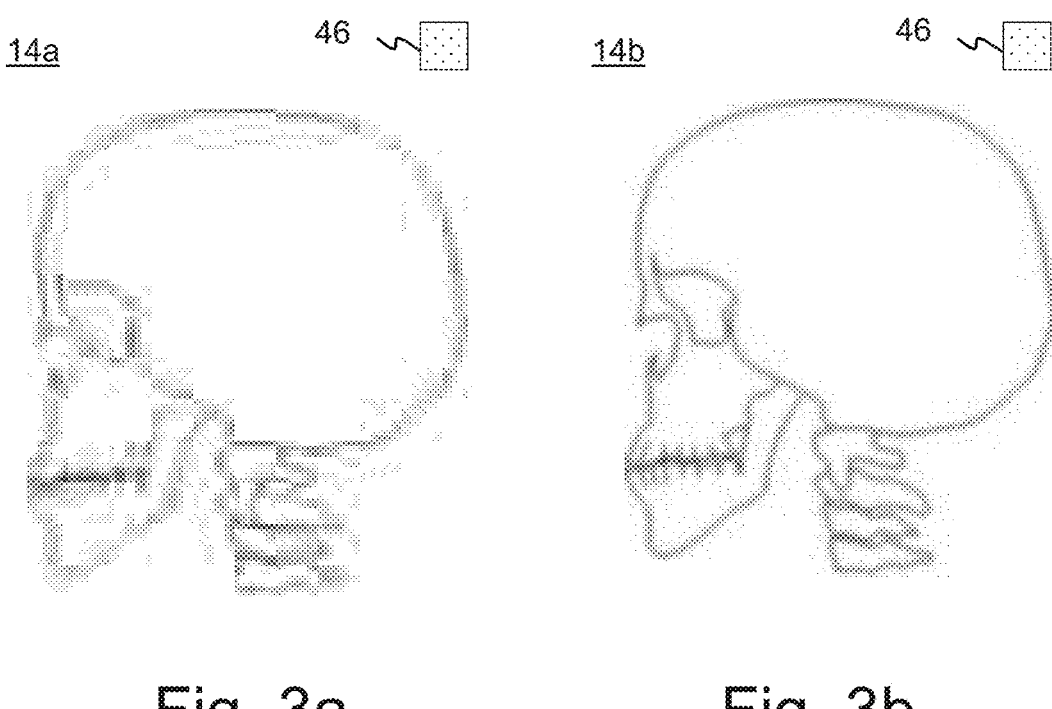
Fig. 3a    Fig. 3b
14c    46    14d    46
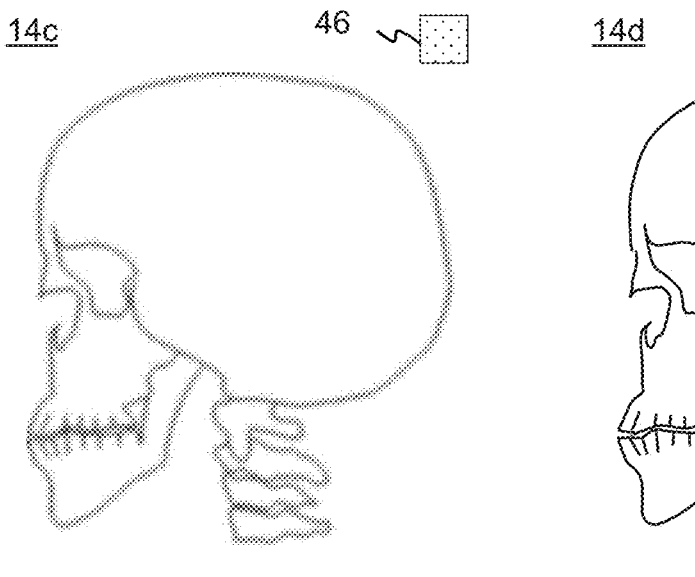
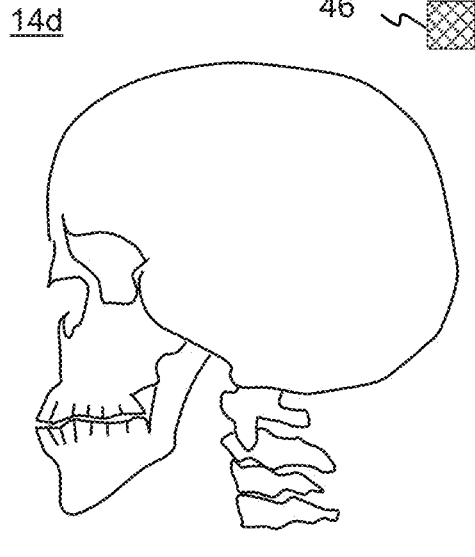
Fig. 3c    Fig. 3d

100

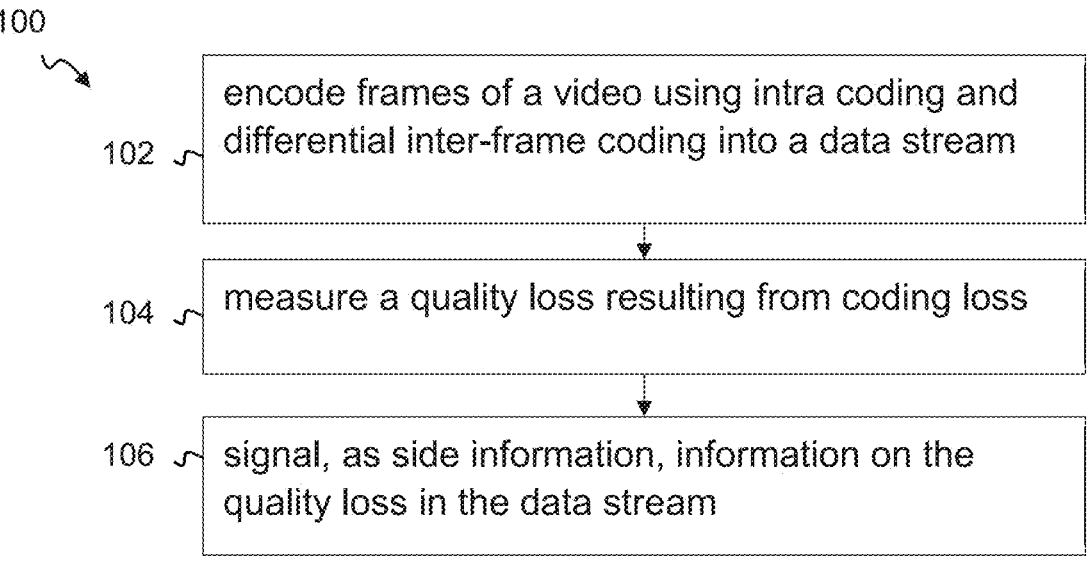

102 — encode frames of a video using intra coding and differential inter-frame coding into a data stream 104 — measure a quality loss resulting from coding loss 106 — signal, as side information, information on the quality loss in the data stream

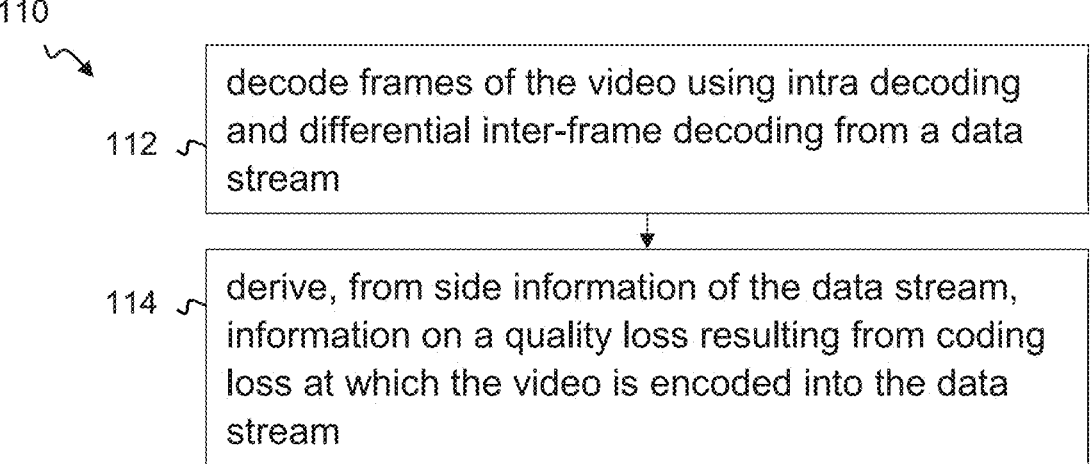

112 — decode frames of the video using intra decoding and differential inter-frame decoding from a data stream 114 — derive, from side information of the data stream, information on a quality loss resulting from coding loss at which the video is encoded into the data stream

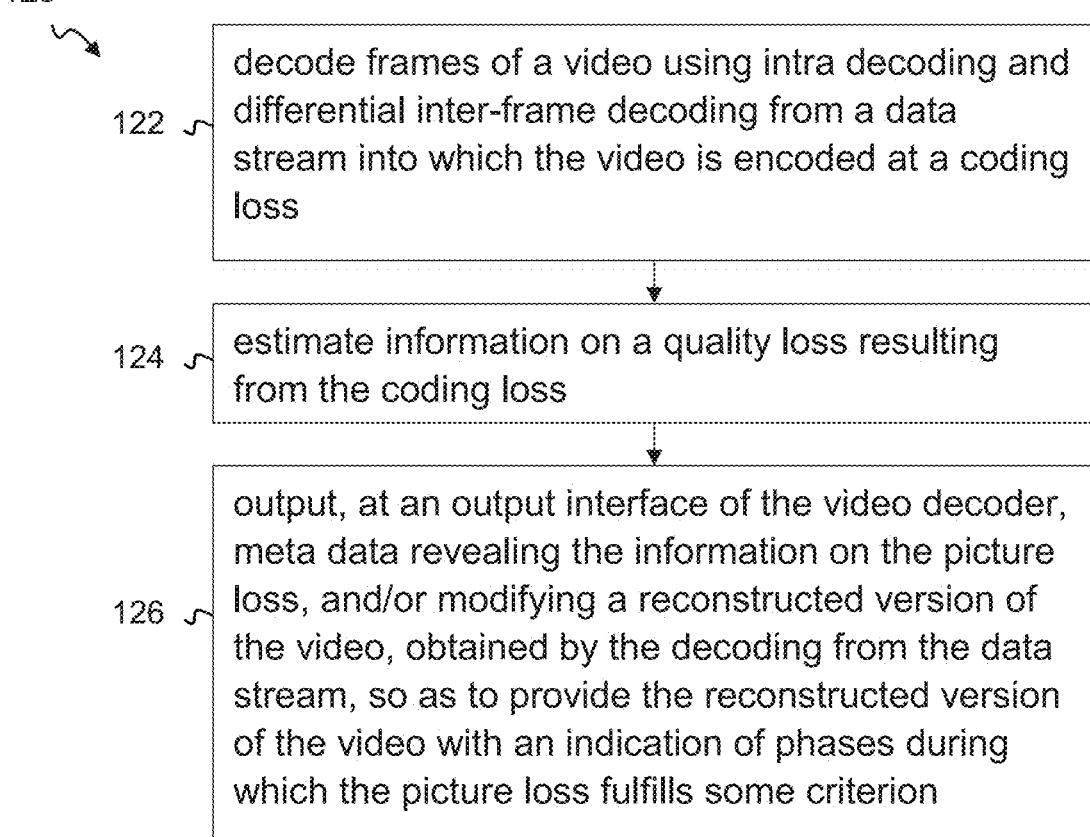

122 — decode frames of a video using intra decoding and differential inter-frame decoding from a data stream into which the video is encoded at a coding loss 124 — estimate information on a quality loss resulting from the coding loss 126 — output, at an output interface of the video decoder, meta data revealing the information on the picture loss, and/or modifying a reconstructed version of the video, obtained by the decoding from the data stream, so as to provide the reconstructed version of the video with an indication of phases during which the picture loss fulfills some criterion

Fig. 8

CODED VIDEO TRANSMISSION CONCEPT

CROSS-REFERENCE TO RELATED APPLICATION

This application claims benefit of U.S. Provisional Patent Application 63/527,254, titled "CODED VIDEO TRANS-MISSION CONCEPT" and filed on Jul. 17, 2023, which is incorporated by reference herein in its entirety.

TECHNICAL FIELD

In the following, different inventive embodiments and aspects will be described regarding coding of a video with a measure of a quality loss, in particular, for frames of a video coded using intra coding and differential inter-frame coding.

BACKGROUND

Many technical applications have a demand for high video quality, such as optical measurement devices, photo and video editing, and medical imaging. For medical diagnostics the visual assessment of medical images are of big importance. To avoid false positives or false negatives in diagnosis the highest quality possible for presentations of medical images on displays is necessary.

Commonly, either uncompressed images are used for such presentation, or images with mathematically lossless compression are used. In addition, displays have to be compliant to specific quality standards such as IEC 62563-2 ("Medical electrical equipment—Medical image display systems—Part 2: Acceptance and constancy tests for medical image displays") [2] or follow the rules in the AAPM On-Line Report No. 03 ("Assessment of Display Performance for Medical Imaging Systems") [3].

One issue stems from presenting high resolution images from a computer. When a computer and displays are connected directly to each other (tethered connection), for some resolutions, e.g., up to 4 k displays this may not be an issue as the transmission is performed uncompressed between the computer and display (see HDMI specs). However, in the case of 8K the connection between display and computer may already use a compression (see DSC compression, https://vesa.org/vesa-display-compression-codecs/dsc/), which may negatively impact video quality.

Further problems arise, when using displays remotely or at larger distances, e.g., connected over a bandwidth limited Ethernet network like 1G Ethernet. In this case, one may have to attach a data receiving computer to the display, which receives and buffers the received data, applies a decoding, and presents it together with a user interface at the display refresh rate to the display.

Another solution may be a real time remote transmission of full screen images at a display refresh rate. This may only be possible with a higher compression. For example, a 3840 by 2160 display with 60 frames per second (fps) and 10 bit per color component and three components may require a 3840×2160×60×10×3=15 Gbit per second transmission line. For a 1G Ethernet interface, this may require a 15:1 compression, which is typically not feasible to perform mathematically lossless.

Therefore, there is a desire for a concept that improves to achieve a better compromise between transmission speed and guarantee for a certain video quality. This is achieved by the subject matter of the independent claims of the present application.

Further embodiments according to the invention are defined by the subject matter of the dependent claims of the present application.

SUMMARY

According to an aspect, a video encoder for encoding a video is configured to encode frames of the video using intra coding and differential inter-frame coding into a data stream, measure a quality loss resulting from coding loss, and to signal, as side information, information on the quality loss in the data stream.

To take advantage of differential inter-frame coding the video encoder on the sender side and the video decoder on the receiver side may use a frame buffer to store the already transmitted/received and reconstructed data.

The application makes use of the fact that the video quality can be improved iteratively for successive differential inter-frame coding steps, e.g., for frames with small changes such as static views. The improvement of the video quality may be so gradual, that a human eye may have difficulties to identify when the quality of the video has reached a sufficient level or has reached a maximum (or plateau or lossless quality). Since the video encoder has access to both, an original video and an encoded—or, in different terms, reconstructable-version of the original video, the video encoder can use the original video as a reference in order to determine a quality loss caused by the video coding process or determine when the encoded video has reached a sufficient video quality. Since the video encoder is able to perform differential inter-frame coding, frames (or portions of frames) inter-frame coded allow also for a decoder-side estimate of the quality loss. For example, differential inter-frame coding may denote that such portions of the video/pictures represent or encode a difference to any previous or the immediately preceding picture, without any motion-compensated displacement between the two pictures/frames, which allows for a time efficient and low complexity coding process on the one hand and enables easy to implement decoder-side quality loss estimation on the other hand. Thus, two approaches are described herein: one where the encoder determines the quality loss information and informs the decoder side via the data stream, and one where the decoder performs the estimation—possibly without any quality loss specific side information guidance from the encoder. With a tool that allows determining when the video quality is sufficient, data transfer for high quality videos can, for example, be stretched over a plurality of frames (e.g., that contribute to iterative differential inter-frame coding for improving the video quality). Therefore, the video quality may no longer be bottlenecked by transmission speed. For example, for a video transmission system between computer and display at the display frame rate and with a bandwidth-limited transmission line, a compression codec (like JPEG XS 3rd edition) can be used which is able to improve the quality from frame to frame for static scenes or images, e.g., up to lossless image quality. In order to enable a reliable diagnostic based on the coded video, such as on medical images, the quality of the image may continuously be surveyed and if it reaches a specific predefined quality or lossless quality, it can be signaled to the viewer (e.g., by signaling the information on the quality loss to the video decoder, which can forward the information to the user). This allows avoiding false diagnosis caused by the transmission system. In addition, the requirements for the transmission system and the codec can be reduced.

According to an aspect fitting to the approach of encoder-side quality loss determination, a video decoder for decoding a video is configured to decode frames of the video using intra decoding and differential inter-frame decoding from a data stream, and to derive, from side information of the data stream, information on a quality loss resulting from coding loss at which the video is encoded into the data stream.

The video decoder is capable of intra decoding and differential inter-frame decoding and is therefore compatible with a data stream encoded by the video encoder described above. Therefore, the video encoder can perform coding that may gradually improve video quality and measures the information on a quality of loss resulting from coding. Since the video decoder is capable of deriving the information on the quality loss encoded into the data stream, the video decoder is able to forward the information to the user. For example, the video decoder may be able to inform the user by modifying the decoding video (e.g. from red to green shading) and/or may provide signals separate from the video such as a signal that can be received by an acoustic, optical or haptic feedback device. The video decoder does not necessarily have to directly inform the user. Alternatively, the video decoder may provide (e.g., save) an image of the video upon deriving from the information on the quality loss, that a sufficient video quality has been reached. The information on the quality loss allows the video codec to successively improve coding quality over a plurality of frames, which can improve a compromise between video quality and data transmission.

According to a further aspect of the present application, fitting to the approach of decoder-sided quality loss estimation, a video decoder for decoding a video is configured to decode frames of the video using intra decoding and differential inter-frame decoding from a data stream into which the video is encoded at a coding loss, to estimate information on a quality loss resulting from the coding loss, and to output, at an output interface of the video decoder, meta data revealing the information on the picture loss, and/or modify a reconstructed version of the video, obtained by the decoding from the data stream, so as to provide the reconstructed version of the video with an indication of phases during which the picture loss fulfills some criterion.

As differential inter-frame decoding allows iterative improvement of the video quality, and the decoding of such differential inter-frame coded frames itself provides information that is related to the video quality, the estimation may be attained readily without great efforts. An example is the measure of the energy of the differential inter-frame coded signal. This energy may be compared with the energy of the previously reconstructed image in the frame buffer. Another example in a constant bitrate working codec is the measurement of the padding zero bits in the packets of the codestream. In variable bitstream coding the reduction of transmitted bits from the maximum allowed bitrate may be taken as a basis for determining the quality measure. Such measurements can be indicative of loss of video quality without requiring the original video as a reference. In the case that the video quality improves (e.g., due to smaller or decreasing differences between subsequent frames), such properties may be processed for a plurality of frames in order to obtain values that allow estimating whether the quality loss is increasing or decreasing. It has been acknowledged that such a video decoder can estimate the information on the quality loss even from data streams that are encoded by a video encoder that lacks the ability to measure and signal the information on the quality loss, or in different terms, a video encoder not specifically designed in this regard. Therefore, the complexity of the video encoder can be reduced (or can be kept as it is) and existing video encoders—or in different terms, bitstreams of such encoders—can be used.

Although embodiments of the present application are also applicable using a codec which uses a typical full frame I-P, where within a group of pictures one frame is intra coded (I) and the subsequent are predictive coded (P) from the past, or an I-P-B coding scheme, where within a group of pictures one frame is intra coded (I), some are predictive (P) coded from the past and some are bidirectional predicted (B) from past and future frames, i.e. codecs where, for the bandlimited transmission, a quality drop within the video sequence will appears every time a new I frame is transmitted, the embodiments fit best to codecs such as JPEG XS $3^{rd}$ edition where the intra coding is done, per frame, only on a small changing part of the image while the rest will be differential coded (so called gradual refresh). This ensures that a transmission error will be corrected on one hand over time but also the advantage of differential coding can be used. Even preferably, only a small part of the image is intracoded per frame/image while the main part of the image is differential inter-coded.

BRIEF DESCRIPTION OF THE FIGURES

Embodiments according to the present invention will subsequently be described taking reference to the enclosed figures in which:

FIG. 3a shows a schematic view of a first decoded frame of a video;

FIGS. 3b to 3d show a schematic view of a second, third, and fourth frame;

FIG. 7a shows a flow diagram of a method for encoding a video;

FIG. 7b shows a flow diagram of a method for decoding a video; and

FIG. 8 shows a flow diagram of a method for decoding a video.

DETAILED DESCRIPTION OF EMBODIMENTS

Figure 1A:
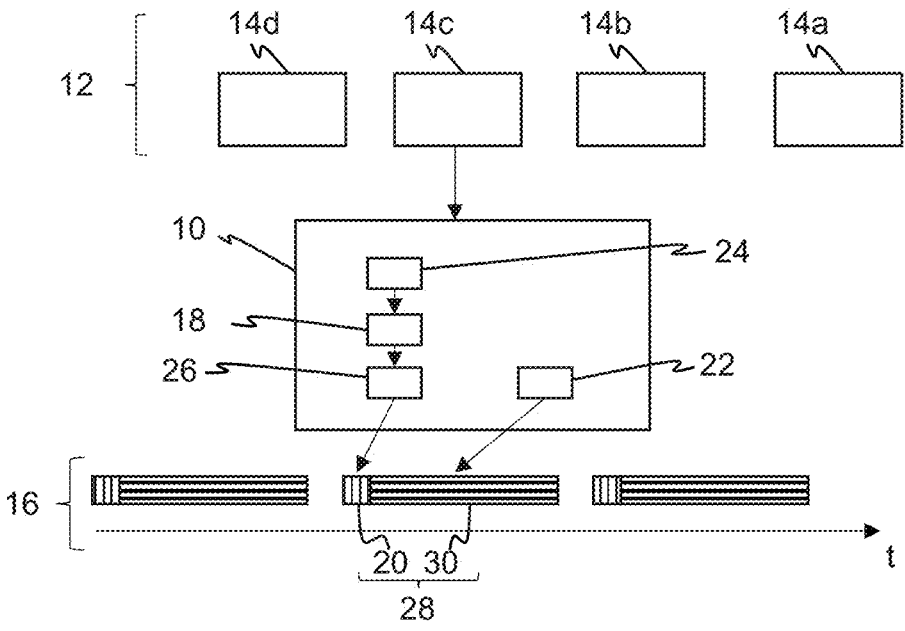
FIG. 1a shows a schematic view of an embodiment of a video encoder for encoding a video.

Equal or equivalent elements or elements with equal or equivalent functionality are denoted in the following description by equal or equivalent reference numerals even if occurring in different figures.

In the following description, a plurality of details is set forth to provide a more throughout explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described herein after may be combined with each other, unless specifically noted otherwise.

In the following, the term "coding" will be used to address both, encoding and decoding. Therefore, a process described in the context of coding can be applied to encoding and decoding. However, the use of the term "encoding" does not exclude similar applicability to decoding (and vice versa), unless stated otherwise.

FIG. 1a shows a schematic view of an embodiment of a video encoder 10 for encoding a video 12. The video encoder 10 is configured to encode frames 14 (e.g., purely differential frames or pictures, or differential frames or pictures with small portions of intra-coded image parts for gradual decoding refresh (GDR)) of the video 12 using intra coding and differential inter-frame coding (e.g., at the same time, e.g., for the same frame, e.g., not intra-frame coding only) into a data stream 16 and to measure a quality loss 18 resulting from coding loss. The video encoder 10 is configured to signal, as side information 20, information on the quality loss 18 in the data stream 16.

For example, the video encoder 10 may comprise an encoding unit (or device) 22 configured to encode the frames 14 of the video 12 using intra coding and differential inter-frame coding (e.g., using only differential inter-frame coding or using differential inter-frame coding and intra coding for the same frame, e.g., at the same time, e.g., different coding modes for different sub-frame portions of the same frame) into the data stream 16, a measuring unit (or device) 24 configured to measure the quality loss 18 resulting from coding loss, and a signaling unit 26 configured to signal, as side information 20, the information on the quality loss 18 in the data stream 16. The units 22, 24, 26 are exemplarily shown as separate units. However, at least two (e.g., all) functions of the video encoder 10 may be performed (fully or partially) by the same device. For example, the video encoder 10 may comprise a processing unit configured to perform at least one the encoding, the measuring, and the signaling. For example, the video encoder 10 may be or may be part of a video camera, optical measurement device, a medical imaging device, a server, a monitor (e.g., a device forwarding a data stream to a display of the monitor), a computer, smart phone, or tablet device. Intra-coding may be performed independently from any previous frame, e.g., without coding a frame difference or sub-frame difference compared to a previous frame.

For example, the video encoder 10 may be configured to perform differential inter-frame decoding for a first portion of a frame 14 (e.g., comprising one or more sub-frame portions) and perform intra-coding for a second portion of the frame 14 (e.g., comprising one or sub-frame portions). In another example, the video encoder 10 may be configured to perform only differential inter-frame decoding for one or more (or all) frames 14 (or a portion thereof). The video encoder 10 may be configured to perform intra-coding of a frame (e.g., a first frame 14 of a video).

The video encoder 10 (or a device comprising the video encoder 10) may be configured to generate data packets 28 comprising encoded video data 30 and the side information 20. The side information 20 may be included in a header, meta data or payload of a packet 28. In the example shown in FIG. 1a, every packet includes side information 20. However, as will be described further below, signaling of the side information 20 may not be required for every packet. For example, a single frame may be signaled using a plurality of packets, wherein only one packet may require the side information 20. Signaling the side information 20 may occur not for every frame (e.g., for every second or third frame). Furthermore, signaling the side information 20 may be conditional (e.g., signaling at a start of a phase of picture invariance or during a phase picture invariance) and therefore may not necessarily have to be performed for a plurality of frames and/or a plurality of packets. Further alternatively, the data stream may not be packetized.

The data stream 16 may comprise wireless data transport such as via a wireless router and/or a cellular network. The data stream may comprise transmission via wire such as between a server and a user or another server and/or between local devices such a monitor and a computer or camera. Furthermore, the data stream may be transported between parts of the same device such as between a data receiver of a monitor and a display of the monitor.

Figure 1B:
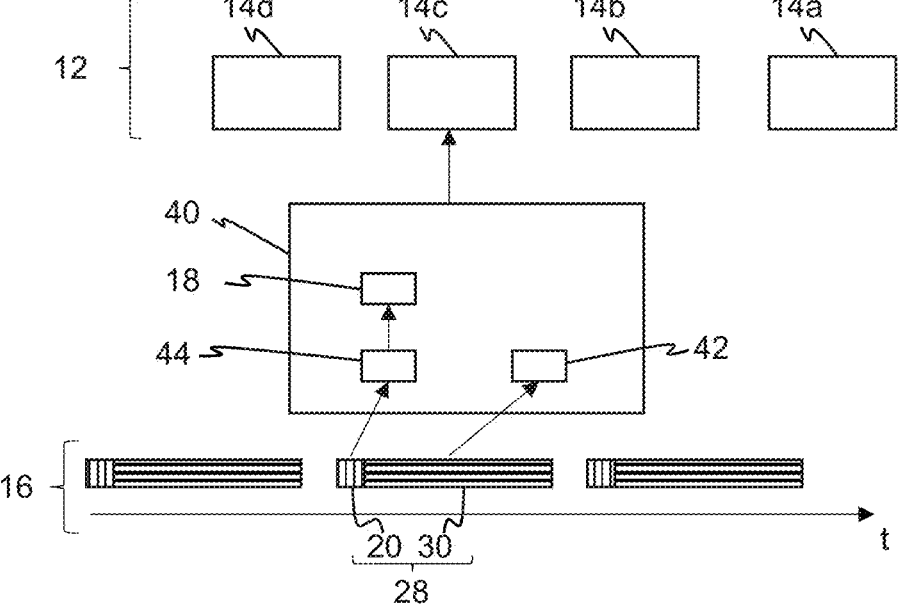
FIG. 1b shows a shows a schematic view of an embodiment of a video decoder for decoding a video.

FIG. 1b shows a schematic view of an embodiment of a video decoder 40 for decoding a video. The video decoder 40 may be configured to decode a video encoded by any video encoder disclosed herein (e.g., video encoder 10 shown in FIG. 1a).

The video decoder 40 is configured to decode frames 14 of the video 12 using intra decoding (or intra-frame decoding) and differential inter-frame decoding (or differentially coded picture, or using only inter-frame decoding without using intra-coding for one or more frames) from a data stream 16, and to derive, from side information 20 of the data stream 16, information on a quality loss 18 resulting from coding loss at which the video 12 is encoded into the data stream 16.

For example, the video decoder 40 may comprise a decoding unit (or device) 42 configured to decode frames 14 of the video 12 using intra decoding and differential inter-frame decoding (e.g., or only using only differential inter-frame coding for one or more frames) from a data stream 16 and a deriving unit (or device) 44 configured to derive from side information 20 of the data stream 16, information on a quality loss 18 resulting from coding loss at which the video 12 is encoded into the data stream 16. The units 42, 44 are exemplarily shown as separate units. However, at least two (e.g., all) functions of the video decoder 40 may be performed (at least partially) by the same device. For example, the video decoder 40 may comprise a processing unit configured to perform at least one the decoding and deriving. For example, the video decoder 40 may be or may be part of a video camera (e.g., for playback of a recorded video), a monitor, a server, a computer, a smart phone, or a tablet device.

Figure 2A:
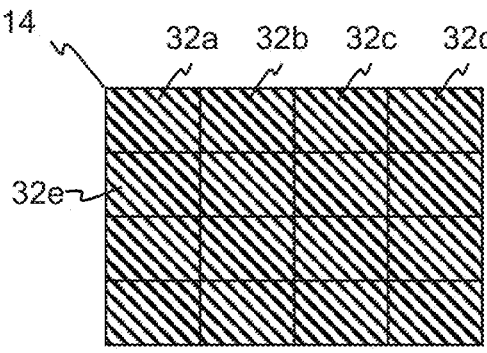
FIG. 2a shows a schematic view of a frame that is divided into N sub-frame portions.

FIG. 2a shows a schematic view of an example of a frame 14 that is divided into N sub-frame portions (or sub-frame areas) 32. In the example shown in FIG. 2a, the frame 14 is divided into 16 sub-frame portions 32 with N=16. However, the frame 14 may comprise any other number of sub-frame portions 32, e.g., with N between 2 and 200, e.g., N between 32 and 120, e.g., N=60. The sub-frame portions 32 may have identical or different shapes (e.g., rectangular, square of polygonal) or sizes. The number of sub-frame portions per frame may be identical or different for a plurality of frames 14.

Figure 2B:
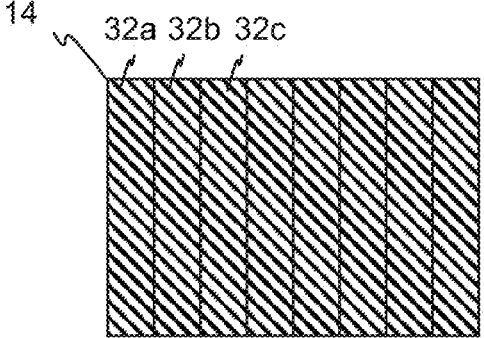
FIG. 2b shows a schematic view of a frame that is divided into strip shaped sub-frame portions.

FIG. 2b shows a schematic view of a frame 14 that is divided into strip shaped sub-frame portions (or sub-frame areas) 32. The frame 14 may have any number N of strip shaped sub-frame portions 32. Each sub-frame portions 32 extends from the top of the frame 14 to the bottom of the frame 14. Alternatively, each sub-frame portions 32 may extend from a left side of the frame 14 to the right side of the frame 14. That is, the stripes may extend vertically or horizontally. Coding frames 14 may include using gradual decoding refresh (GDR), in units of one or more sub-frame portions 32 as will be described in more detail below. Strip shaped sub-frame portions 32 may facilitate the use of gradual decoding refresh.

When a frame 14 is encoded, a loss of quality may occur between an undistorted version of the video 12 (e.g., a video before encoding) and the encoded video 12, i.e. the version reconstructed from the coded data stream. Information of the video in the encoded data stream may be less than information of the undistorted version of the video 12, which may result in or form a quality loss. The information in the data stream 16 may comprises a quality measure parameter which monotonically increases with decreasing quality loss, in other words, it may be a quality measure. The information in the data stream 16 may alternatively, comprise a quality measure parameter which monotonically decreases with decreasing quality loss, in other words, is a loss measure.

The video encoder 10 may be configured to perform the measuring and the signaling at a spatial granularity corresponding to frames or sub-frame portions. For example, the video encoder 10 may be configured to perform the measuring and the signaling at a temporal granularity corresponding to a frame rate of the video 12. For example, in the case of a frame rate of 30 frames per second, the video encoder 10 may be configured to perform the measuring and the signaling also at 30 frames per second (or 30 Hz), or optionally, in an example with 60 sub-frame portions 32 and a spatial granularity corresponding to the sub-frame portions, the video encoder 10 may be configured to perform the measuring and the signaling at 60 times per frame (or 30×60=1800 times per second). Alternatively, the video encoder 10 may be configured to perform the measuring and the signaling at a rate slower than the frame rate (e.g., half or third of the frame rate, i.e. every second or third frame). The video encoder 10 may be configured to perform the measuring and/or signaling continuously (e.g., at the rates described herein) or conditionally (e.g., for frames belonging to the phase of picture invariance, e.g., at the rates described herein).

The video decoder 40 may be configured to derive the information on the quality loss from the data stream at a spatial granularity corresponding to frames 14 or sub-frame portions 32. For example, the video decoder 40 may be configured to derive the information on the quality loss from the data stream at the same spatial granularity as the video encoder 10. Alternatively, the video decoder 40 may be configured to derive the information on the quality loss from the data stream at a spatial granularity different from the spatial granularity of the video encoder 10 (e.g., with half the spatial granularity). The video decoder 40 may have any spatial granularity as described above for the video encoder 10.

The video encoder 10 may be configured to measure the quality loss by determining an average of a per-pixel deviation measure between an undistorted version of the video 12 (e.g., an undistorted frame 14 or one or more undistorted sub-frame portions 32 of one or more frames 14) and a reconstructable version of the video 12 (e.g., a reconstructed frame 14 or one or more reconstructed sub-frame portions 32 of one or more frames 14) as reconstructable from the data stream 16.

The video decoder 40 may therefore derive information on the quality loss that is indicative of or formed by an average of a per-pixel deviation measure between an undistorted version of the video and a reconstructable version as reconstructable from the data stream 16.

For example, the video encoder 10 may be configured to determine a deviation measure for each (or a selection of) pixels of a frame 14 between the undistorted version and the reconstructed version of the frame 14. The reconstructed version of the frame 14 may be (or be based on) a frame 14 or one or more portions (e.g., sub-frame portions 32) of one or more frames 14 reconstructed from the encoded frames 14 for the data stream 16.

For example, the video encoder 14 may be configured to encode a frame 14 using differential inter-frame coding and subsequently determine a frame difference between a current frame and a previous (e.g., immediately preceding) frame. Then, the video encoder 14 may be configured to reconstruct the current frame 14 based on the frame difference and the previous frame 14. However, the reconstructed and/or undistorted version of the video 12 is not limited to an entire and single frame 14. As will be described further below, the reconstructed and/or undistorted version of the video 12 may be formed by a portion of a first frame 14, e.g., portions (e.g., sub-frame portions 32) for which gradual decoding refresh (e.g., using intra-coding) was not used (e.g., the only a portion of the first frame 14 is used that is differentially inter-frame coded). The reconstructed and/or undistorted version of the video 12 may additionally be formed by a portion (e.g., sub-frame portion 32) of a preceding or subsequent second frame 14, e.g., one or more portions (e.g., sub-frame portions 32) for which gradual decoding refresh was not used in the first frame 14 but was used in the second frame 14 (e.g., for which intra-coding was used in the first frame and differential inter-frame coding was used in the second frame 14).

The measure of deviation may be based on deviations (e.g., linear, absolute, squared, or cubed differences) between frames of the reconstructed video and the undistorted video in regard to sample values and/or transform coefficients (e.g., assigned to pixels). The measure of deviation may be based on (or be formed by) a sum of (e.g., linear, absolute, squared, or cubed) differences of samples values (e.g., at least one of luma values and chroma values) between the undistorted version and the reconstructed version of the frame 14 (or a portion of the frame 14). Instead of or in addition to a sum of the differences, an average, a weighted average or a median may be formed. The measure of deviation may be based on or be formed by a peak signal-to-noise ratio (PSNR).

Additionally or alternatively, the measure of deviation may be determined in the transform domain, e.g., a wavelet domain. For example, quantized transform coefficients of the transform of the original frame may be coded in case of intra-frame coding (e.g., for a portion of a frame 14 when using gradual decoding refresh) and quantized transform coefficients of the transform of a frame difference (of a current frame) to a previous frame may be coded in case of differential inter-frame coding. The video encoder 10 may be configured to perform the encoding of the frames 14 in a transform domain and measure the quality loss by averaging (e.g., using an arithmetic mean, a median, or a weighted average) or summing over transform coefficients (or absolute values thereof) of the transform domain (e.g. measure quality loss for a frame by averaging over all coefficients belonging to a non-refreshed area of this frame, e.g. mean absolute or mean squares of the transform coefficients). For example, the video encoder 10 may be configured to determine a square or absolute value of coefficients belonging to all (or a part of) sub-frame portions 32 that are not refreshed in this frame (e.g., that are differentially inter-frame coded and not intra-coded) and form a sum or average of the squared or absolute value of the coefficients.

The video encoder 10 may be configured to measure the quality loss for a frame 14 by averaging over all coefficients belonging to a non-refreshed area of a current frame, e.g. based on or using mean absolute values or mean square values of the transform coefficients.

The video encoder 10 may be configured to signal the information on the quality loss in form of or based on mean squared difference (MSD) values or mean absolute difference (MAD) values. The video decoder 40 may be configured to derive the information on the quality loss from the data stream 16 in form of MSD or MAD values.

The video encoder 10 may be configured to signal the information on the quality loss as a binary information having two states, a first one of which corresponds to sufficient quality and a second one of which corresponds to insufficient quality, or by use of an integer number or floating point scale. The video decoder 40 may be configured to derive the information on the quality loss from the data stream 16 as a binary information having two states, a first one of which corresponds to sufficient quality and a second one of which corresponds to insufficient quality, or by use of an integer number or floating point scale. The two states may be signaled using a binary flag or bit, wherein a value of "1" indicates sufficient quality and "0" indicates insufficient quality (or vice versa). The integer number or floating point scale may indicate the quality loss in arbitrary units (e.g., from 1 to 1000), as MSD values, as MAD values, as decibels (e.g., for PSNR), as a ratio (e.g., a quotient or percentage) relative to a threshold (e.g., between sufficient and insufficient quality), or as a ratio (e.g., a quotient or percentage) relative to the undistorted version of the video or relative to a previously (e.g., immediately preceding) decoded frame. A threshold for determining sufficient quality or insufficient quality (e.g., for the quality loss as a binary information having two states) may be defined as an absolute value or as a value relative to an undistorted version of the video 12 or relative to a previously (e.g., immediately preceding) decoded frame. The threshold may be defined in arbitrary units (e.g., "900"), as a MSD value, as a MAD value, or as decibels (e.g., for PSNR).

The video encoder 10 may be configured to perform the differential inter-frame coding by subtraction between a current frame 14 and a previously coded (e.g. in terms of (de)coding order and presentation order) frame 14 to obtain a difference and coding the difference into the data stream (e.g., using quantization, e.g., not using quantization; e.g., forming a difference between quantized values such as a difference between quantized transform coefficients). The difference may be obtained in a spatial domain or in a transform domain (or wavelet domain). The difference may be or may be based on a difference between samples values (in the spatial domain) and/or a difference between (e.g., quantized) transform coefficients.

The video decoder 40 may be configured to perform the differential inter-frame decoding by decoding, from the data stream 16, a (e.g., quantized or not quantized) difference between a current frame 14 and a previously decoded (e.g. in terms of (de)coding order and presentation order) frame 14 and performing an addition between the (e.g., quantized or not quantized) difference and the previously decoded (e.g. in terms of (de)coding order and presentation order) frame 14 (e.g., wherein the difference may be a difference between quantized transform coefficients). The video decoder 40 may be configured to decode, from the data stream 16, the quantized difference between the current frame 14 and the immediately preceding frame 14 in a transform domain, perform the addition in the transform domain to obtain a transform of the current frame 14 and subject the transform to a re-transformation.

The video encoder 10 may be configured to form the subtraction between the current frame 14 (or a portion thereof) and the previously coded frame 14 (or a portion thereof) at a mutually undisplaced manner (e.g. without motion compensatedly determined frame-wise mutual inter-frame displacement). The video decoder 40 may be configured to form the addition between the (e.g., quantized or not quantized) difference and the previously decoded frame 14 at a mutually undisplaced manner (e.g. without motion compensatedly determined frame-wise mutual inter-frame displacement).

For example, with reference to FIG. 1a, when encoding a current frame 14c, the video encoder 10 may be configured to form a subtraction between the current frame 14c and a previously coded frame 14b (or frame 14a). For example, a first transform coefficient or sample value at a top left of the previous frame 14b is subtracted from a first transform coefficient or sample value at the top left of the current frame 14c. Subsequently a second transform coefficient or sample value to the right of the first transform coefficient of the previous frame 14b is subtracted from a second transform coefficient or sample value the right of the first transform coefficient of the current frame 14c. The subtraction may be similarly performed for all (or a selection such as only not refreshed) transform coefficients or sample values of the frames 14c, b.

As a result, information related to displacement of the frames 14b, c (e.g., a motion vector) does not have to be determined or transmitted. Differential inter-frame coding is compatible with the use of a frame buffer such as defined in the standard JPEG XS 3rd edition. Furthermore, differential inter-frame coding that uses no displacement allows for a low complexity and fast implementation of a frame buffer that stores values (e.g. transform coefficient or sample value) for a current frame that can be easily updated based on the subtraction. Such a frame buffer may be used in at least one of the video encoder 10 and the video decoder 40.

The video encoder 10 may be configured to encode the frames 14 sequentially using a coding order, wherein the coding order coincides with a presentation order of the frames. The video decoder 40 may be configured to decode the frames sequentially using a coding order, wherein the coding order coincides with a presentation order of the frames 14. The video encoder 10 and/or video decoder 40 therefore may not skip frames or go backwards in the presentation order (e.g., unlike an MPEG coder which may perform coding in a different frame order than a presentation order). As a result, a size of storage of data for frames can be reduced, e.g., for storing only one or more previous frames. Such a storage has low complexity and allows fast processing of the video 12.

The video encoder 10 may be configured to perform the differential inter-frame coding by subtraction between a current frame and an immediately preceding frame to obtain a difference and coding the difference into the data stream (e.g., using quantization, e.g., not using quantization; e.g., a difference between quantized values such as quantized transform coefficients). The video decoder 40 may be configured to perform the differential inter-frame decoding by decoding, from the data stream, a (e.g., quantized or not quantized) difference between a current frame and an immediately preceding frame and performing an addition between the (e.g., quantized or not quantized) difference and the current frame. As a result, a size of the storage for data for frames can be further reduced, e.g., to frame buffer that only stores data (e.g., sample values or transform coefficients) of the immediately preceding frame 14 and that can be updated to a current frame by adding the subtraction. Such a storage has even lower complexity and allows faster coding of the video 12.

The video encoder 10 may be configured to, in a frame-wise manner, switch between coding the frames using intra-coding and coding the frames using differential inter-frame coding. For example, the video encoder 10 may be configured to associate with each frame one of several coding modes, wherein the coding modes may comprise intra-coding and differential inter-frame coding so that each frame associated with intra-coding is coded using intra-coding completely, and each frame associated with differential inter-frame coding is coded using differential inter-frame coding completely. The video decoder 40 may be configured to in a frame-wise manner, switch between decoding the frames 14 using intra-decoding and decoding the frames 14 using differential inter-frame decoding (in other words, the video decoder associates with each frame one of several decoding modes, the decoding modes comprising intra-decoding and differential inter-frame decoding so the each frame associated with intra-decoding is decoded using intra-decoding completely, and each frame associated with differential inter-frame decoding is coded using differential inter-frame de-coding completely).

For example, differential inter-frame coding may be useful for encoding a video 12 captured by a camera device that is not moving or moving very little. For example, medical professional may keep a camera device at a fixed position pointed at or inside a patient (e.g., inside a body cavity before a surgical procedure). When the camera device position is fixed, subsequently recorded frames of the camera differ little or not at all (e.g., except for background noise or minor tissue movement). With little or no difference between frames, inter-frame coding requires very little data transfer in order to signal the difference between frames. The video quality can be gradually improved with each differentially inter-frame coded frame 14, wherein after coding a plurality frames 14, a higher quality video (or image) can be achieved, despite requiring only a small transfer of data (due to the small difference between frames 14). As a result, data transfer may no longer form a bottleneck for encoding/decoding a high quality image and a video quality decoded by the decoder 40 may improve. It is noted, that the coding approach disclosed herein is not limited to a video captured by a fixed camera device, which naturally may differ (e.g., due to noise). The video 12 may comprise two or more identical frames 14 (e.g., copies of a previous frame 14). For example, the user may capture a high quality image that is stored in the camera device, wherein the video encoder 10 may be configured to encode a video 12 with a plurality of copies of the high quality image.

FIG. 3a shows a schematic view of a first decoded frame 14a of a video 12. The frame 14 shows exemplarily a medical image of a patient that a user (e.g., medical professional) may want to study for a diagnosis or a surgical procedure. Therefore, the user may require a video 12 with a high quality (e.g., 4K, 8K or higher). However, a transmission speed for the data stream 16 may not be sufficient for providing the first frame 14a at the desired quality. However, subsequent frames 14b, 14c, 14d of the patient may not differ significantly from the first frame 14a, e.g., due to a fixed position of a recording camera (e.g., by a holding device or steadily held by the user).

FIGS. 3b to 3d show a schematic view of a second, third, and fourth frame 14b, c, d of the video that are immediately following (in presentation and coding order) the first frame 14a of FIG. 3a.

When encoding the second frame 14b, the video encoder 10 may be configured to perform differential inter-frame coding by subtraction between the current frame 14b and the previously coded (e.g. in terms of (de)coding order and presentation order) frame 14a to obtain a difference and to code the difference into the data stream 12 (e.g., using quantization or not using quantization, e.g., a difference between quantized transform coefficients). For example, the video encoder 10 may be configured to form the subtraction between the current frame 14b and the previously coded frame 14a at a mutually undisplaced manner.

Since frames 14a and 14b do not differ significantly, the difference does not require a lot of data to transmit. In the example shown in FIG. 3a-d, the video encoder 10 is configured to perform the differential inter-frame coding by subtraction between a current frame 14b and an immediately preceding frame 14a to obtain a difference and coding the difference into the data stream 16 (e.g., using quantization or not using quantization).

The video decoder 40 may be configured to perform the differential inter-frame decoding by decoding, from the data stream 16, a (e.g., quantized or not quantized) difference between the current frame 14b and a previously decoded (e.g. in terms of (de)coding order and presentation order) frame 14a and to perform an addition between the (e.g., quantized or not quantized) difference and the previously decoded (e.g. in terms of (de)coding order and presentation order) frame 14a. For example, the video decoder 40 may be configured to decode, from the data stream 16, the (e.g., quantized or not quantized) difference between the current frame 14b and the immediately preceding frame 14a in a transform domain, perform the addition in the transform domain to obtain a transform of the current frame 14b and subject the transform to a re-transformation.

As can be seen in FIG. 3b, the quality of the second frame 14b is therefore better than the quality of the first frame 14a.

Similarly, the video encoder 10 and the video decoder 40 may be configured to perform differential inter-frame for the third frame 14c, based on a (e.g., quantized or not quantized) difference between the third frame 14c and the second 14b. As can be seen in FIG. 3c, the third frame 14c has a higher quality than the second frame 14b.

The process is continued to the fourth frame 14c, which has a higher quality than the third frame 14c. The quality of the fourth frame 14c is sufficient, which may be determined by the video encoder 10, e.g., by measuring the quality loss resulting from coding loss and determining whether the quality loss meets one or more criteria.

In the example shown in FIG. 3a, the video encoder 10 is configured to signal the information on the quality loss as a binary information having two states, a first one of which corresponds to sufficient quality and a second one of which corresponds to insufficient quality. The video decoder 40 may be configured to derive the information on the quality loss from the data stream 12.

The video decoder 40 may be configured to modify a reconstructed version of the video 12, obtained by the decoding from the data stream 16, so as to provide the reconstructed version of the video 12 with an indication 46 of phases during which the quality loss fulfills one or more criteria (e.g. if quality loss falls below a certain threshold which may depend on a display's display quality, e.g. so that overall quality loss such as sum of display-caused quality loss and quality loss as signaled in the data stream is lower than some threshold).

In FIG. 3a-d, the indication 46 is exemplarily shown as an icon that changes appearance according to whether the quality loss fulfills a criteria. The indication 46 has a first colour (e.g., red) when the video quality is insufficient (see FIG. 3a-c) and a second colour (e.g., green) when the video quality is sufficient (see FIG. 3d). Alternatively or additionally, the icon may have a first and second shape (e.g., a cross and a check mark). The indicator 46 may comprise a border (e.g., with different colours) for the frame 14.

The indicator 46 does not have to be visible in both cases of sufficient and insufficient quality. In other words, the video decoder 40 may be configured to modify the reconstructed version of the video 12, obtained by the decoding from the data stream 16, so as to provide the reconstructed version of the video 12 with an indication 46 only when the quality is sufficient or only when the quality is not sufficient. For example, the indicator 46 may display an icon and/or border only as long as the video quality is not sufficient (or only as long as the video quality is sufficient).

The video decoder 40 may be configured to provide a binary indicator as described above, for example, when deriving the information on the quality loss from the data stream 16 as a binary information having two states, a first one of which corresponds to sufficient quality and a second one of which corresponds to insufficient quality.

In the case that the video decoder 40 is configured to derive the information on the quality loss from the data stream as non-binary information such as by use of an integer number or floating point scale, the video decoder 40 may be configured to determine two states, a first one of which corresponds to sufficient quality and a second one of which corresponds to insufficient quality. The video decoder 40 may be configured to determine the two states as described above with reference to the video encoder 10 (e.g., using a threshold). For example, the video encoder 10 may signal the information as a peak signal-to-noise ratio value and the video decoder 40 may be configured to compare the peak signal-to-noise ratio value with a threshold. The video decoder 40 may subsequently provide a binary indication 46 as described above.

However, the video decoder 40 may be configured to provide a non-binary indication 46 with more than two states, for example, when deriving the information on the quality loss from the data stream 16 as non-binary information such as by use of an integer number or floating point scale.

The indication 46 may comprise display of a number that corresponds or is based on (e.g., rescaled to a percentage)

the integer number or floating point scale. Additionally or alternatively, the indication 46 may comprise an icon and/or border, wherein at least one of a colour, a brightness, and an opaqueness is representative of the integer number or floating point scale. For example, the indication 46 may comprise a border that gradually switches from a first colour (e.g., red) to a second colour (e.g., yellow) depending on the integer number or floating point scale, and may switch to a third colour (e.g., green) when a target quality is reached.

Alternatively or additionally, the video decoder 40 may be configured to output, at an output interface of the video decoder 40, meta data revealing the information on the quality loss (or picture loss). The output interface of the video decoder 40 may be (communicatively) coupled or coupleable to an indicator device different from a display for displaying the reconstructed video 12. For example, the indicator device may comprise at least one of a loud speaker, a haptic feedback device, a further display (separate from the display), and a computer. Such an indicator device allows indicating a user about the quality loss without requiring the user to have vision of the reconstructed video 12. For example, the user may be standing too far from the display for the reconstructed video 12 or may have to focus on a camera device (e.g., for safety reasons or due to holding the camera device). The indicator device may indicate the user that the quality of the video 12 is sufficient (e.g., by outputting a sound, a vibration of a handheld device or a display at close proximity such as on the camera device).

The example shown in FIG. 3a-d was realized only using differential inter-frame coding, wherein each frame 14a-d is entirely coded using differential inter-frame coding (and no intra coding). However, the video encoder 10 and the video decoder 40 may be configured to use gradual decoding refresh so as to spatially reposition, from frame to frame 14, an intra-coded portion of the frames 14 of the video 12 over a frame area with coding portions of the frames 14, and, external to the intra-coded portion, use differential inter-frame coding. The video decoder 40 may be configured to use gradual decoding refresh so as to spatially re-position, from frame to frame 14, an intra-decoded portion of the frames of the video 12 over a frame area with decoding portions of the frames, and, external to the intra-decoded portion, use differential inter-frame decoding.

Figure 4A:
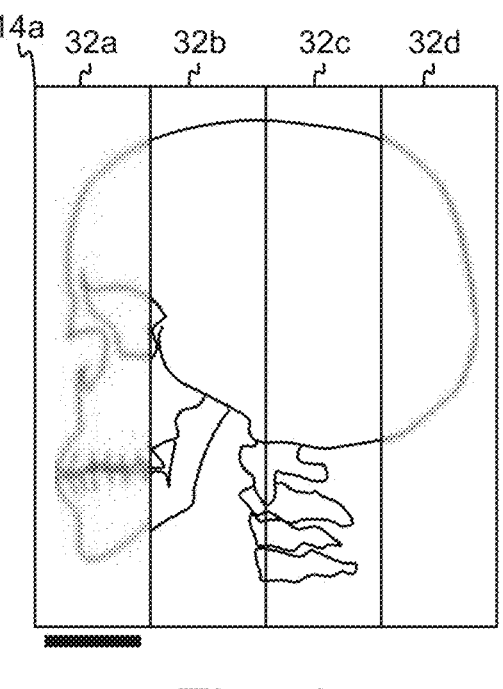
FIG. 4a shows a schematic view of a first decoded frame of a video.

FIG. 4a shows a schematic view of a first decoded frame 14a of a video 12. The first frame 14 is divided into four strip shaped sub-frame portions 32a-d. Alternatively, the first frame 14a may comprise any other number N of strip shaped sub-frame portions 32 (e.g., N=60) and any other shape of sub-frame portions 32 as described herein. The four sub-frame portions 32a-d cover the entire area of the first frame 14a. Alternatively, the sub-frame portions 32 may cover only a portion of the first frame 14a.

It is noted that in FIG. 4a-d show no indication 46. However, any indication 46 disclosed herein may be implemented in the example of FIG. 4a-d.

The video encoder 10 may be configured to perform intra-coding and differential inter-frame coding for different portions of a frame 14. For each frame 14, one of the four sub-frame portions 32 forms a portion of the frame 14 (in the following termed "intra-coded portion") that is intra-coded and three of the four sub-frame portions 32 form a portion of the frame 14 (in the following termed "differential inter-frame coded portion"), for which differential inter-frame coding is used. However, the sub-frame portion 32 that is intra-coded changes with each frame. It is noted that in the example shown in FIG. 4a-d, the intra-coded portion is only a single sub-frame portion 32. However, the intra-coded portion may comprise more than one sub-frame portion 32 (e.g., a column of four intra-coded portions 32 shown in FIG. 2a). In FIG. 4a-d, the sub-frame portion 32 that forms the intra-coded portion is indicated with a black bar below as a visual indicator for the reader and does not form a part of the frames 14a-d.

It is further noted that with reference to FIGS. 4a-d, an example is shown, in which the video quality of a sub-frame portion 32 decreases upon intra-coding. However, there may be scenarios, in which intra-coding may improve the video quality at a similar or faster rate than differential inter-frame coding (e.g., for a first or a first few frames). In this simplified example, it is assumed that an intra-coded sub-frame portion 32 reaches a maximum video quality (e.g., that cannot be improved significantly by being further inter-coded) after being differentially inter-frame coded twice. In a more realistic scenario, such a maximum or asymptotic video quality may require a larger amount of iterative differential inter-frame coding.

In FIG. 4a, a first sub-frame portion 32a at the left side of the frame 14a forms the intra-coded portion (marked with a black bar below). A second, third and fourth sub-frame portion 32c-d forms the differential inter-frame coded portion.

The video encoder 10 may be configured to form a subtraction between the differential inter-frame coded portion of the first frame 14a and (co-located) second, third, and fourth sub-frame portion of a previously coded frame (not shown in FIG. 4a) at a mutually undisplaced manner. The video encoder 10 may then code the difference into the data stream 16 (e.g., using quantization, e.g., not using quantization; e.g., a difference between quantized values such as quantized transform coefficients).

The video decoder 40 may be configured to perform the differential inter-frame decoding by decoding, from the data stream 16, the (e.g., quantized or not quantized) difference between (the differential inter-frame coded portion of) the first frame 14a and (the second, third, and fourth of sub-frame portions of) the previously decoded frame and to perform an addition between the (e.g., quantized or not quantized) difference and the previously decoded frame in order to reconstruct the second, third, and fourth sub-frame portions 32c-d of the first frame 14.

Similarly, the video encoder 10 may be configured to perform intra-coding of the first sub-frame portion 32a and to encode coding information (e.g., transform coefficients or sample values) for intra-coding the first portion 32a into the data stream 16. The video decoder 40 may be configured to perform intra-coding of the first sub-frame portion 32a based on coding information for intra-coding the first portion 32a extracted from the data stream 16. Intra-coding may not require any coding information of a previous frame and may allow reconstructing the respective sub-frame portion 32 newly. Therefore, intra-coding may form a reset of the frame portion within the sub-frame portion 32, which can be improved by differential inter-frame coding in subsequent frames.

FIG. 4a may already represent a stage of the video, in which the frames 14 have a high video quality (e.g., due to iterative differential inter-coding), wherein the first sub-frame portion 32a is intra-coded without using information of the previous frame. Therefore, the video quality of the first sub-frame portion 32a is lower than for the second, third, and fourth sub-frame portions 32b-c. The fourth sub-frame portion 32d was intra-coded in the previous frame (similar to an intra-coding that will be described below with reference to FIG. 4d), but is already differentially inter-frame coded once in FIG. 4a. Therefore, the fourth sub-frame portion 32d has a better video quality than the "freshly" intra-coded first sub-frame portion 32a, but has a lower video quality compared to the second and third sub-frame portions 32c, d, which have been inter-coded at least twice and therefore have reached maximum video quality.

Figure 4B:
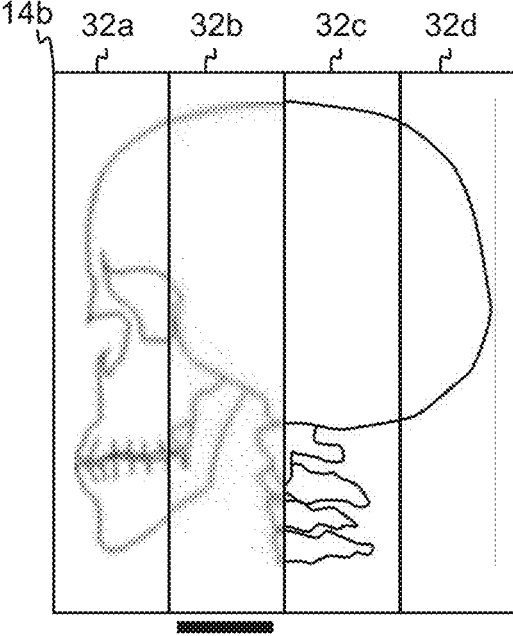
FIG. 4b shows a schematic view of a second decoded frame of the video.

FIG. 4b shows a schematic view of a second decoded frame 14b of the video 12. In the second frame 14b, the intra-coded portion is formed by the second sub-frame portion 32b (as indicated by a black bar below) and the differential inter-frame coded portion is formed by the first, third, and fourth sub-frame portions 32a, c, d. As a result, the intra-coded portion has shifted by one sub-frame portion 32 to the right. However, any other pattern for a shifting of the intra-coded portion may be used instead, such as from the right to the left or from the top to the bottom (or vice versa).

When comparing the first frame 14a and the second frame 14b, the video quality of the differential inter-frame coded portion has improved. The fourth sub-frame portion 32d has now been inter-coded twice and reached the maximum video quality. Since the first sub-frame portion 32a has only been inter-coded once, it has not reached maximum video quality yet. The intra-coded portion (or second sub-frame portion 32b) has been intra-coded, wherein the video quality decreased (or reset) to a similar quality as the first sub-frame portion 32a in the first frame 14a (see FIG. 4a).

Figure 4C:
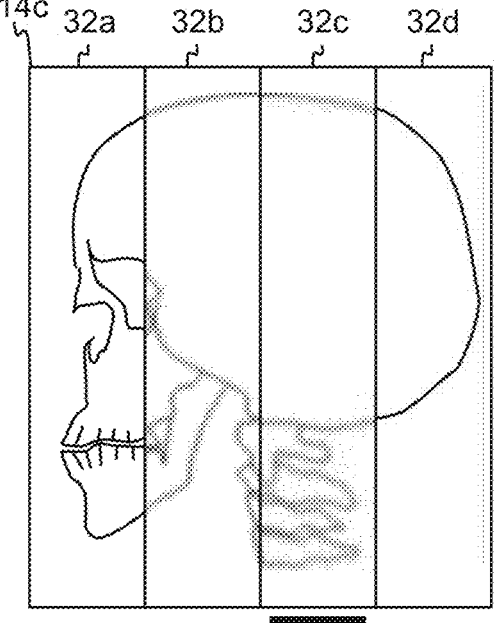
FIG. 4c shows a schematic view of a third decoded frame of the video.

FIG. 4c shows a schematic view of a third decoded frame 14c of the video 12. In the third frame 14c, the intra-coded portion is formed by the third sub-frame portion 32c (as indicated by the black bar below) and the differential inter-frame coded portion is formed by the first, second, and fourth sub-frame portions 32a, b, d. As a result, the intra-coded portion has shifted by one sub-frame portion 32 to the right.

When comparing the second frame 14b and the third frame 14c, the video quality of the differential inter-frame coded portion has improved. The first sub-frame portion 32a has now been inter-coded twice and reached the maximum video quality. Since the second sub-frame portion 32b has only been inter-coded once, it has not reached maximum video quality yet. The intra-coded portion (or third sub-frame portion 32c) has been intra-coded, wherein the video quality decreased (or reset).

Figure 4D:
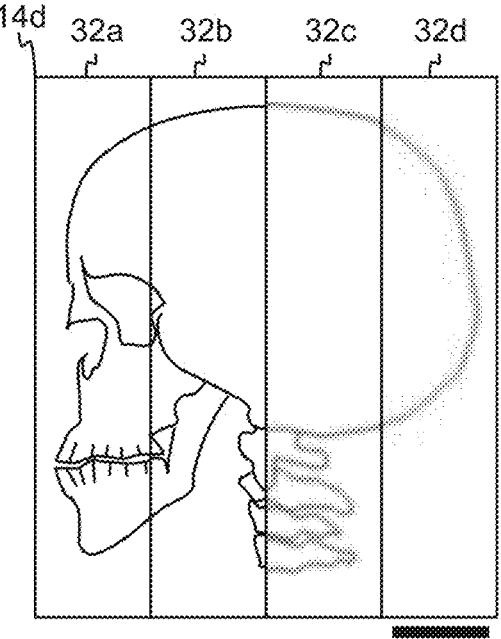
FIG. 4d shows a schematic view of a fourth decoded frame of the video.

FIG. 4d shows a schematic view of a fourth decoded frame 14d of the video 12. In the fourth frame 14d, the intra-coded portion is formed by the fourth sub-frame portion 32d (as indicated by the black bar below) and the differential inter-frame coded portion is formed by the first, second, and third sub-frame portions 32a, b, c. As a result, the intra-coded portion has shifted by one sub-frame portion 32 to the right. During the coding of the four frames 14a-d, the intra-coded portion has therefore been moved through the entire frame 14.

The second sub-frame portion 32b has now been inter-coded twice and reached the maximum video quality. Since the third sub-frame portion 32c has only been inter-coded once, it has not reached maximum video quality yet. The intra-coded portion (or fourth sub-frame portion 32d) has been intra-coded, wherein the video quality decreased (or reset).

In a frame that follows the fourth frame 14 (not shown), the first sub-frame portion 32a is again forming the intra-coded portion, which corresponds to a scenario similar to the first frame 14a shown in FIG. 4a.

As can be seen in FIG. 4a-d, the intra-coded portion shifts through the entire frame within a periodicity of four frames, wherein each one of the sub-frame portions 32 eventually is intra-coded once and differentially inter-frame coded three times. By dividing the frame into a larger number of sub-frame portions, the length of the period and the number of times a sub-frame portion is differentially inter-frame coded can be increased. For example, if the frame 14 is divided into N (e.g., N=60) sub-frame portions 32, the intra-coded portion is shifted through the entire frame 14 after a period of N frames, wherein each sub-frame portion 32 is intra-coded once and differentially inter-frame coded N−1 (e.g., 59) times.

Intra-frame coding allows coding a frame portion without requiring coding information (e.g., sample values or transform coefficients) of a previous frame. Therefore, infra-frame coding is less susceptible to error propagation caused by potential errors in a previous frame. For example, if the video 12 includes an error (e.g., due to a transmission error or coding error) or a significant scenery change (e.g., an accidental obscuring of the camera lens), the intra-frame coding provides a base information that can subsequently be improved by differential inter-frame coding. The video coding is therefore more robust while enabling a decreased data rate. The use of gradual decoding refresh may result in a worse video quality at a first frame (or sub-frame portions), but the differential inter-frame coding allows the video quality to iteratively improve (similar like a progressive coding system).

There may also be fully differentially inter-coded frames for which the quality information directly results from the described averaging/accumulation/summation over the transform coefficients (or their squares or the like) of the frame. For example, a GDR sequence may be temporally placed in certain distances, the GDR sequence encompassing N consecutive GDR coded frames with N being the number of sub-regions which are, as described, spatially traversed to be intra-coded, with the frames inbetween being completely differentially inter-coded.

The video encoder 10 may be configured to encode the frames 14 of the video 12 using a bitrate control according to which a constant bitrate (in other words, number of bits per frame area) is obeyed at units of sub-frame portions 32 (e.g., N=60 with N being the number of sub-frame areas 32, wherein same might be of equal size) into which the frame area is partitioned.

For example, each of the N sub-frame portions 32 consecutively becomes the currently refreshed intra-coded portion, e.g. one sub-frame portion in one frame 14, a next sub-frame portion in the next frame and so forth (e.g., as described with reference to FIG. 4a-d), while, in each frame 14, the remaining N−1 sub-frame portions 32 form the non-refreshed portion and are all coded using differential inter-frame coding. For example, the bitrate control may require the bitrate for each of the sub-frame portions 32 to not differ by more than a pre-determined threshold (e.g., less than 10% or less than 5%, or less than 2%).

Bit padding (e.g., assigning zeroes to some or all unused bits that would have been available given a target bit rate) might be used for sub-frames 32 for which the encoded data stream portion is shorter than defined by the constant bitrate in order to reach the sub-frame-size defined by the constant bitrate.

The video encoder 10 may be configured to constantly measure the quality loss resulting from coding loss, and to constantly signal, as side information, information on the quality loss in the data stream 16, for example for each frame 14 (or set of frames 14) or each sub-frame portion 32 (or set of sub-frame portions).

When a user handles a camera device that captures the video 12, frames may differ significantly during movements of the camera device (e.g., while moving the camera towards a target position), so that subsequent frames of the video differ significantly. As a result, the continuous measurements of the quality loss resulting from coding loss performed by the video encoder 10 may indicate a larger quality loss, e.g., indicating in an insufficient video quality. The video encoder 10 continuously signals information on the quality loss to the video decoder 40, which may provide information to the user that the video quality is insufficient. However, once the user has arranged the camera device in a fixed position, subsequent frames 14 differ less and the video encoder 10 may start to measure a lower quality loss, which is signaled to the video decoder 40. The video decoder 40 may indicate a sufficient video quality to the user (and/or start saving the video on a storage device).

The video decoder 40 may be configured to save a static frame based on the video 12 (e.g., a freeze frame) once a sufficient video quality has been determined. A user may subsequently be able to move the camera device (e.g., for capturing further videos or for removing the camera device from a surgical site). The video decoder 40 may be configured to provide an output (e.g., visually, acoustically, or haptically) for indicating to the user that static frame has been saved (or stored).

When the user starts moving the camera device, a content of the recorded frames may differ more, causing a coding loss. The video encoder 10 is configured to measure and signal the coding loss to the video decoder 40. As a result, the use can be informed about the video quality reaching a target quality as well as be informed about the video quality falling below the target quality.

Alternatively to a continuous measuring and signaling, the video encoder 10 may be configured to perform measuring and signaling the information conditionally (e.g., based on a user input). The video encoder 10 may be configured to signal in the data stream a start of a phase of picture invariance (in other words, phases of static picture content).

For example, the video encoder 10 may be configured to receive a signal that indicates the phase of picture invariance. A user may perform an input (e.g., via mouse click, keyboard, or voice command) that signals the start of a phase of picture invariance (e.g., upon arranging the camera device in a fixed position). Alternatively, a camera holder for arranging the camera device in a fixed position may be configured to send the signal to the video encoder 10 upon receiving the camera device (e.g., due to a switch of the camera holder being triggered upon receiving the camera device).

The video encoder 10 may be configured to apply the measuring and the signaling for frames belonging to the phase of picture invariance (e.g. and refrain from the application for a frame not belonging to any phase of picture invariance, or in other words, determining, for each frame of the video whether the respective frame belongs to any phase in picture invariance and, if so, apply the measuring and the signaling to the respective frame). The signaling may comprise signaling a binary flag (or bit) for the duration of the phase of picture invariance. Alternatively, the video encoder 10 may be configured to signal a message indicative of the start of the phase.

The duration of the phase of picture invariance may be a pre-determined time (e.g., 5 seconds) or be determined based on criteria related to the measured quality loss. For example, the video encoder 10 may be configured to determine an end of the picture invariance when the quality loss exceeds a predetermined threshold. As a result, the video encoder 10 may be configured to signal in the data stream an end of the picture invariance (e.g., by refraining from signaling the binary flag or by signaling a message indicative of the end of the phase).

The video decoder 40 may be configured to derive from the data stream 16 the indication of a start of a phase of picture invariance, for example in form of a message indicating the start or a continuous signaling of a binary bit. The video decoder 40 may be configured to output, at an output interface of the video decoder, meta data revealing the start of the phase of invariance. The output interface may be coupled or coupleable to a monitor, speaker, haptic feedback device, or computer. The monitor, speaker, haptic may be configured to indicate to the user that the phase of picture invariance has started (e.g., and provide a confirmation about a successfully registered input of the user).

In the examples shown in FIGS. 1a and 1b, the video encoder 10 is the entity that measures the quality loss resulting from the coding loss. The video encoder 10 subsequently signals, as side information, information on the quality loss. However, the decoder may be able to at least estimate the information on the quality loss without the information being additionally signaled by the encoder.

Figure 5A:
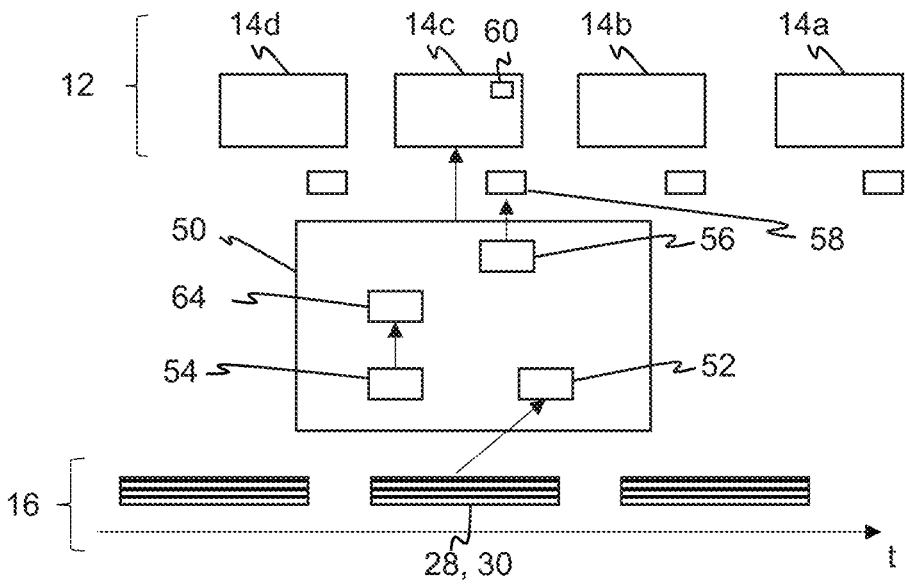
FIG. 5a shows a schematic view of an embodiment of a video decoder for decoding a video.

FIG. 5a shows a schematic view of an embodiment of a video decoder 50 for decoding a video.

The video decoder 50 is configured to decode frames 14 of the video 12 using intra decoding and differential inter-frame decoding (e.g., using intra decoding and differential inter-frame decoding for the same frame; e.g., when using gradual decoding refresh; e.g., at the same time; or using only differential inter-frame decoding for one or more frames) from a data stream 16 into which the video 12 is encoded at a coding loss, and to estimate information on a quality loss resulting from the coding loss. The video decoder 50 is further configured to output, at an output interface 56 of the video decoder 50, meta data 58 revealing the information on the picture loss, and/or modify a reconstructed version of the video 12, obtained by the decoding from the data stream, so as to provide the reconstructed version of the video 12 with an indication 60 of phases during which the picture loss fulfills some criterion.

The criterion may comprise one or more thresholds for the estimated quality loss. For example, the indication 60 may be representative of whether the estimated quality loss exceeds a threshold (e.g., indicating not sufficient video quality) or is smaller than the threshold (e.g., indicating sufficient video quality). The indication 60 may be realized as the indication 46 described above (except dependent on the estimated quality loss instead of the information on a quality loss resulting from coding loss at which the video is encoded into the data stream).

The criterion may optionally depend on both, the estimated quality loss and the information on a quality loss signaled by the encoding device 10. For example, the criterion may be fulfilled if the (estimated) quality loss falls below a certain threshold (which may depend of display's display quality), e.g. so that an overall quality loss such as sum of display-caused quality loss and quality loss as signaled in the data stream is lower than a further threshold.

Alternatively or additionally, the criterion may comprise a measure of padding bits (e.g., zeroes or ones as padding bits). A larger amount of padding bits may indicate a smaller difference between subsequent frames and/or sub-frame portions and therefore that a higher video quality has been reached. On the other hand, a smaller amount of padding bits may indicate a larger difference between subsequent frames and/or sub-frame portions (e.g., because the video encoder encodes more information as the video quality can still be improved a lot) and therefore that the video quality is not sufficient yet. The criterion may include one or more thresholds for an amount or density of padding bits. The criterion may include a function between a measure of padding bits and the video quality. Padding bits may, for example, be used in a constant bitrate working coded, wherein bits that would be provided (due to the constant bit rate) for transmission of coding information is unused and therefore filed with padding bits or padding zeroes.

Alternatively or additionally, the criterion may comprise a deviation (e.g., difference) between a maximum allowed bitrate and a current bitrate (e.g., a current and/or average bitrate for a current frame). A larger deviation (e.g., a lower bitrate) may indicate a smaller difference between frames and/or sub-frame portions and therefore that a higher video quality has been reached. Vice versa, a smaller deviation may indicate a lower video quality. The criterion may include one or more thresholds for a current and/or average bitrate (e.g., in absolute values or relative to a maximum bitrate). The criterion may include a function between a measure of the current and/or average bitrate and the video quality. A maximum bitrate may be used, for example, in combination with a variable bitstream coding.

For example, the video decoder 50 may comprise a decoding unit (or device) 52 configured to decode frames 14 of the video 12 using intra decoding and differential inter-frame decoding (e.g., using intra decoding and differential inter-frame decoding for the same frame; e.g., when using gradual decoding refresh; e.g., at the same time; or using only differential inter-frame decoding for one or more frames) from a data stream 16 into which the video 12 is encoded at a coding loss. The video decoder 50 may comprise an estimating unit (or device) 54 configured to estimate the information 64 on the quality loss resulting from the coding loss.

The units 52, 54 are exemplarily shown as separate units. However, at least two (e.g., all) functions of the video decoder 50 may be performed (at least partially) by the same device. For example, the video decoder 50 may comprise a processing unit configured to perform at least one the decoding and estimating. For example, the video decoder 40 may be or may be part of a video camera (e.g., for playback of a recorded video), a monitor, a server, a computer, a smart phone, or a tablet device. For example, the video decoder 50 can estimate the quality loss by itself and forward it to a user.

The video decoder 50 may be configured to derive, from side information of the data stream 16, an indication of a start of a phase of picture invariance, and perform the estimating and the outputting and/or modifying depending on the indication of the start of the phase of picture invariance so as to perform the estimating and the outputting for the phase of picture invariance. The video decoder 50 may comprise any feature or may be configured to perform any step regarding the phase of picture invariance disclosed above with reference to the video decoder 40.

The video decoder 50 may be configured to estimate the information 64 on the quality loss resulting from coding loss at which the video 12 is encoded into the data stream 16 based on an average level (or, in other words, average amplitude) or average energy of a non-refreshed frame portion (in other words, portions decoded using differential inter-frame decoding). Additionally or alternatively, at least one of a sum, a variance, and a median of the level or energy of a (e.g., non-refreshed) frame portion or frame may be determined. For example, the information on the quality loss may be or be based on a sum (or any other measure) of linear, absolute or squared value of sample values or transform coefficients of the encoded frames or frame differences.

For example, in the case that the entire frame 14 is differentially inter-frame decoded, the average level or energy may be determined for the entire frame 14. If only a portion of the frame 14 is differentially inter-frame decoded, the average level or energy may be determined based on that portion of the frame 14. The average level or energy (or sum, variance or median) may be determined for a plurality of decoded frames. Alternatively or additionally, the average level or energy may be determined for a plurality of differences between decoded frames, e.g., based on coded information in the data stream 16. For example, with increasing video quality, a difference between decoded frames 14 may gradually decrease (e.g., because a difference between the decoded frame 14 and the original frame decreases). Therefore, a decrease of the average of a frame difference may be indicative of an increase of the video quality.

Alternatively, the video decoder 50 may be configured to estimate the information on the quality loss resulting from coding loss at which the video is encoded into the data stream based on a combination (e.g. a sum) of an average level (or, in other words, average amplitude) or average energy of a non-refreshed frame portion (in other words, portions decoded using differential inter-frame decoding) of a frame for which the information on the quality loss is to be estimated and an average level (or, in other words, average amplitude) or average energy of a co-located non-refreshed frame portion of a subsequent frame following or a preceding frame preceding the frame for which the information on the quality loss is to be estimated, wherein the co-located non-refreshed frame portion is co-located to a refreshed portion of the frame for which the information on the quality loss is to be estimated.

It is noted that the video encoder might be configured to encode the video 12 using gradual decoding refresh according to the details described herein.

The video decoder 50 may be configured to use gradual decoding refresh by intra-coding an intra-coded portion of the frame 14 and differentially inter-frame decoding another portion (e.g., rest) of the frame 14. By refraining from determining an average level or average energy of the refreshed frame portion, the overall average may be more representative of the video quality currently being improved by differential inter-frame coding.

The intra-coded portion of the frame 14 may be differentially inter-frame decoded in an immediately subsequent or preceding frame. Therefore, the video decoder 50 may be able to obtain the "missing" level or energy from the intra-coded portion in the portion co-located to the refreshed portion of the frame for which the information on the quality loss is to be estimated. Therefore, an average of the all frame portions can be obtained. As a result, the overall average may form a better basis for comparison between frames 14.

Alternatively, the refreshed portion of the current frame 14 may be omitted for estimating the information on a quality loss and the average is only formed for regions of the frame 14 that are non-refreshed (e.g., differentially inter-frame coded and not intra-coded). As a result, a complexity of the estimating process can be reduced.

The information on a quality loss may be determined based on at least one of an average, sum, median, and weighted average of the energy or level of the frame portions as described above.

The video decoder 50 may be configured to output, at the output interface of the video decoder, as the meta data 58 revealing the information on the picture loss, a binary information whether the quality loss meets a predetermined quality minimum level, with setting the binary information to indicate that the quality loss meets the predetermined quality minimum level if the average level or average energy falls below a predetermined threshold, or modify the reconstructed version of the video, obtained by the decoding from the data stream, so as to provide the reconstructed version of the video with the indication of phases during which the picture loss fulfills some criterion in such a manner that the indication provides a binary information whether the quality loss meets a predetermined quality minimum level, so that the quality loss is indicated to meet the predetermined quality minimum level if the average level or average energy falls below a predetermined threshold.

Any step for estimating the information on the information on the quality loss described above with reference to video decoder 50 may optionally be used by any video encoder described herein (e.g., video encoder 10; e.g., for measuring the quality loss from coding loss).

The video decoder 50 may be configured to output the meta data 48 as described above with reference to the video decoder 40 configured to output meta data (e.g., displaying an icon or a border or providing an acoustic output).

The video decoder 50 may be configured to perform the differential inter-frame decoding by decoding, from the data stream 16, a (e.g., quantized or not quantized) difference between a current frame 14 and a previously decoded (e.g. in terms of (de)coding order and presentation order) frame 14 (e.g., a difference between quantized values such as between quantized transform coefficients) and performing an addition between the (e.g., quantized or not quantized) difference and the previously decoded (e.g. in terms of (de)coding order and presentation order) frame 14. The video decoder 50 may be configured to decode, from the data stream 16, the (e.g., quantized or not quantized) difference between the current frame 14 and the immediately preceding frame 14 in a transform domain, perform the addition in the transform domain to obtain a transform of the current frame and subject the transform to a re-transformation. The video decoder 50 may be configured to perform differential inter-frame decoding as described above with reference to the video decoder 40.

The video decoder 50 may be configured to form the addition between the (e.g., quantized or not quantized) difference and the previously decoded frame 14 at a mutually undisplaced manner (e.g. without motion compensatedly determined frame-wise mutual inter-frame displacement). The video decoder 50 may be configured to form the addition as described above with reference to the video decoder 40.

The video decoder 50 may be configured to decode the frames sequentially using a coding order, wherein the coding order coincides with a presentation order of the frames. The video decoder 50 may be configured to perform the differential inter-frame decoding by decoding, from the data stream, a (e.g., quantized or not quantized) difference between a current frame and an immediately preceding frame (e.g., a difference between quantized values such as quantized transform coefficients) and performing an addition between the (e.g., quantized or not quantized) difference and the current frame. The video decoder 50 may be configured to decode, from the data stream 16, the (e.g., quantized or not quantized) difference between the current frame 14 and the immediately preceding frame 14 in a transform domain, perform the addition in the transform domain to obtain a transform of the current frame and subject the transform to a re-transformation. The video decoder 50 may be configured to at least one of decode the frames, perform the differential inter-frame decoding, and decode the (e.g., quantized or not quantized) difference as described above with reference to the video decoder 40.

The video decoder 50 may be configured to, in a frame-wise manner, switch between decoding the frames using intra-decoding and decoding the frames using differential inter-frame decoding (in other words, the video de-coder associates with each frame one of several decoding modes, the decoding modes comprising intra-decoding and differential inter-frame decoding so the each frame associated with intra-decoding is decoded using intra-decoding completely, and each frame associated with differential inter-frame decoding is coded using differential inter-frame decoding completely), and/or use gradual decoding refresh so as to spatially re-position, from frame to frame, an intra-decoded portion of the frames of the video over a frame area with decoding portions of the frames, and external to the intra-decoded portion, use differential inter-frame decoding. The video decoder 50 may be configured to at least one of switch and use gradual decoding refresh as described above with reference to the video decoder 40.

Figure 5B:
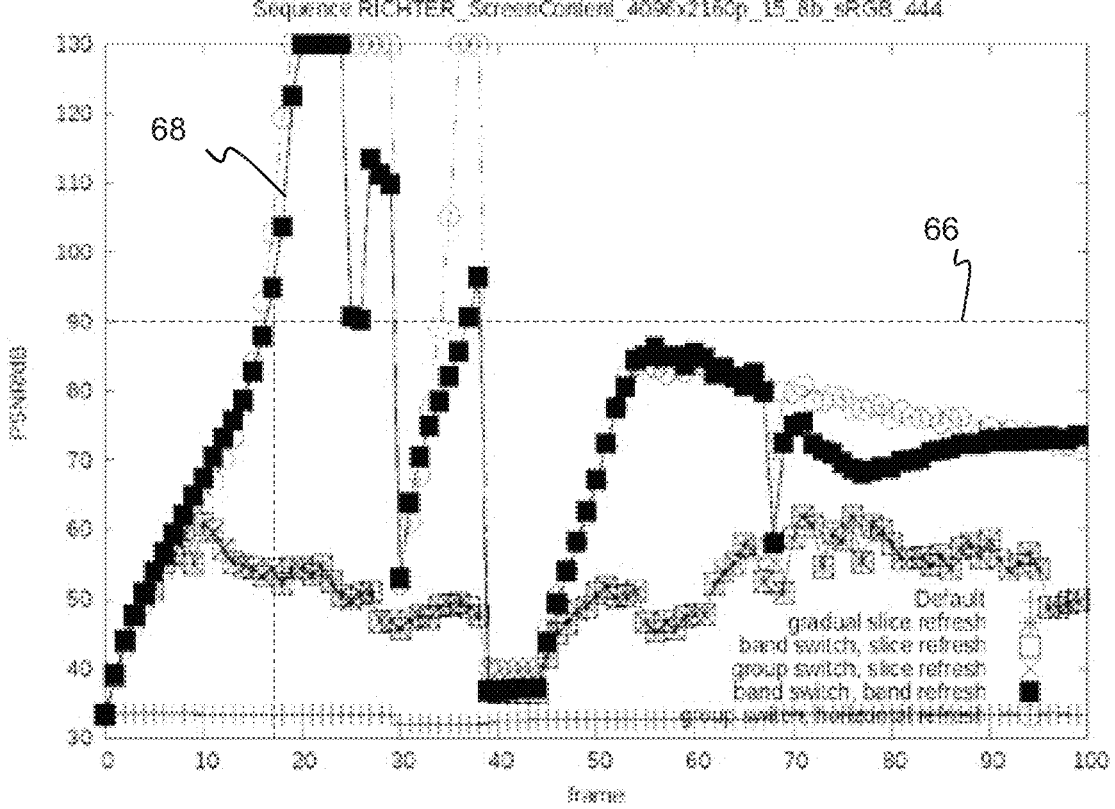
FIG. 5b shows a schematic view of a diagram between a frame number and a peak signal-to-noise ratio.

FIG. 5b shows a schematic view of a diagram between a frame number and a peak signal-to-noise ratio (PSNR).

The PSNR may be an example of a measure of the quality of a video. A low noise is commonly an indicator for good video quality. Therefore, a larger ratio between a signal peak and noise may indicate a higher video quality. The PSNR may constitute the information about the quality loss or form a basis for measuring or determining the information about the quality loss.

The video encoder 10 may be configured to determine the PSNR of a current frame. The video encoder 10 itself may determine the measure of quality loss based on the PSNR or may signal the PSNR as side information to the video decoder 40, 50, which may be configured to determine the measure of quality loss.

For example, the video encoder 10 may be configured to determine whether the PSNR exceeds a pre-determined level. In the example shown in FIG. 6, a threshold 66 of 90 dB is used to differentiate between sufficient video quality (equal or above 90 dB) and insufficient video quality (below 90 dB). A test measurement 68 (indicated with black squares) shows a low PSNR for the first frame (approximately 33 dB), wherein the PSNR gradually increases with increasing frame number. The smallest frame number with a PSNR above 90 dB is frame number 17 (with approximately 95 dB).

The video encoder 10 may, for example, signal information on the quality loss as binary information having two states, which signals insufficient quality for frame numbers 1 to 16 and a sufficient quality for frame number 17. Signaling a binary information may increase signaling efficiency. Alternatively, the video encoder 10 may signal more complex information such as the value of the PSNR. Such complex information may allow the video decoder 40, 50 to adapt better. For example, the video decoder 40, 50 may have access to a more suitable threshold (e.g., adapted to a monitor type or adapted to for a specific task such as displaying a specific medial or technical video).

Different combinations of video encoder and video decoder may form different systems for coding a video.

Figure 6A:
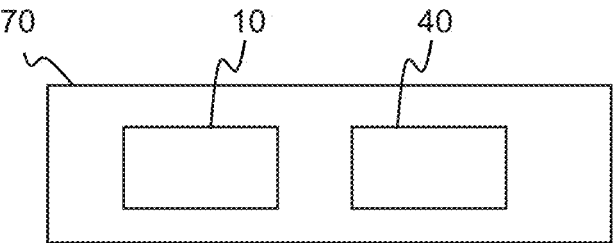
FIG. 6a shows a schematic view of a first system comprising the video encoder and the video decoder.

FIG. 6a shows a schematic view of a first system 70 comprising the video encoder 10 and the video decoder 40 as described herein.

The video encoder 10 is configured to encode frames of the video using intra coding and differential inter-frame coding (e.g., using intra-coding and differential inter-frame coding for the same frame when using gradual decoding refresh, or using only differential inter-frame coding; e.g., for one or more or all frames) into a data stream, measure a quality loss resulting from coding loss, and signal, as side information, information on the quality loss in the data stream.

The video decoder 40 is configured to decode frames of the video using intra decoding and differential inter-frame decoding (e.g., using intra-coding and differential inter-frame coding for the same frame when using gradual decoding refresh, or using only differential inter-frame coding; e.g., for one or more or all frames) from a data stream, derive, from side information of the data stream, information on a quality loss resulting from coding loss at which the video is encoded into the data stream.

The video encoder 10 and the video decoder 40 may comprise any feature and/or may be configured to perform any step disclosed herein.

The video encoder 10 is the entity that measures the quality loss. Therefore, a complexity of the decoder 40 may be reduced. Furthermore, the video encoder 10 may have access to a better reference for measuring the quality loss in form of the original video.

Figure 6B:
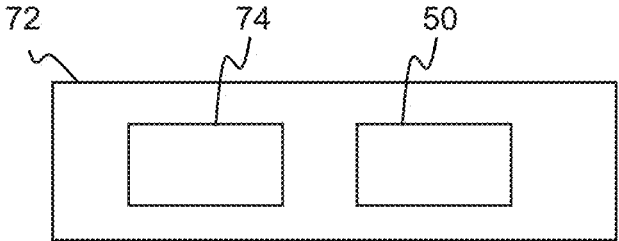
FIG. 6b shows a schematic view of a second system of a video encoder configured to encode frames of the video using intra coding and differential inter-frame coding into a data stream and a video decoder.

FIG. 6b shows a schematic view of a second system 72 of a video encoder 74 configured to encode frames of the video using intra coding and differential inter-frame coding (e.g., using intra-coding and differential inter-frame coding for the same frame when using gradual decoding refresh, or using only differential inter-frame coding; e.g., for one or more or all frames) into a data stream 16 and a video decoder 50 as described herein.

The video encoder may be any video encoder 10 described herein, but may also be a video encoder that lacks the ability to measure a quality loss resulting from coding loss, and signal, as side information, information on the quality loss in the data stream. The video encoder is not required to measure the quality loss, as the video decoder 50 is configured to estimate information on a quality loss resulting from the coding loss.

The video decoder 50 is the entity that estimates the quality loss. Therefore, an video encoder with less complexity (e.g., without a capacity to measure the quality loss) may be used. Consequently, the video decoder 50 may be compatible with more types of video encoders.

Figure 6C:
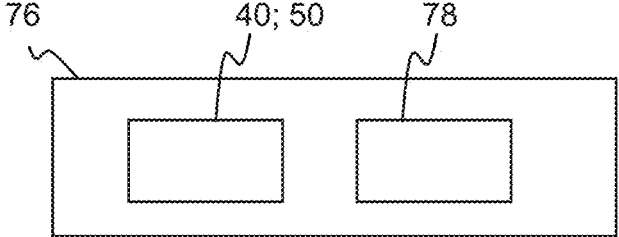
FIG. 6c shows a schematic view of a third system of a video decoder and a display for displaying a reconstructed video derived by the video decoder by decoding.

FIG. 6c shows a schematic view of a third system 76 of a video decoder 40 or 50 as described herein and a display 78 for displaying a reconstructed video derived by the video decoder 40 or 50 by decoding.

The decoder 40 or 50 may be part of the display 78 or coupled or coupleable with the display 78. The display 78 may be configured to display with an Ultra-high-definition television resolution such as 4K UHD, 8K UHD or higher.

The decoder 40 or 50 allow a gradual improvement of a video quality even for smaller transmission speeds.

The display 78 may be configured to modify the reconstructed version of the video 12 so as to present the reconstructed version of the video 12 modified with an indication of phases during which the picture loss fulfills some criterion. For example, the display 78 may be configured to modify the reconstructed version of the video so as to present reconstructed version of the video modified with an indication of phases using an indicator 46 as described above. The phases may, for example, indicate sufficient or insufficient video quality. The phases may be indicative of information on the quality loss from the data stream by use of an integer number or floating point scale as described above.

The display 78 may be configured to modify the reconstructed version of the video 12 so as to present the reconstructed version of the video 12 modified with an indication of phases of picture invariance. The indication of phases of picture invariances may be implemented as described above (e.g., with reference to video encoder 10 and video decoder 40).

FIG. 7a shows a flow diagram of a method 100 for encoding a video.

The method 100 comprises, in step 102, encoding frames 14 of the video 12 using intra coding and differential inter-frame coding (e.g., using intra-coding and differential inter-frame coding for the same frame when using gradual decoding refresh, or using only differential inter-frame coding; e.g., for one or more or all frames) into a data stream 16. The method 100 comprises, in step 104, measuring a quality loss resulting from coding loss.

The method 100 may be performed by the video encoder 10. The method 100 may comprise any step performed by the video encoder 10 disclosed herein.

FIG. 7b shows a flow diagram of a method 110 for decoding a video.

The method 110 comprises, in step 112, decoding frames 14 of the video 12 using intra decoding and differential inter-frame decoding (e.g., using intra-coding and differential inter-frame coding for the same frame when using gradual decoding refresh, or using only differential inter-frame coding; e.g., for one or more or all frames) from a data stream 16.

The method 110 comprises, in step 114, deriving, from side information of the data stream 16, information on a quality loss resulting from coding loss at which the video 12 is encoded into the data stream 16.

The method 110 may be performed by the video decoder 40. The method 110 may comprise any step performed by the video decoder 40 disclosed herein.

FIG. 8 shows a flow diagram of a method 120 for decoding a video.

The method 120 comprises, in step 122, decoding frames 14 of the video 12 using intra decoding and differential inter-frame decoding (e.g., using intra-coding and differential inter-frame coding for the same frame when using gradual decoding refresh, or using only differential inter-frame coding; e.g., for one or more or all frames) from a data stream 16 into which the video 12 is encoded at a coding loss. The method 120 comprises, in step 124, estimating information on a quality loss resulting from the coding loss. The method comprises, in step 126, outputting, at an output interface 56 of the video decoder 50, meta data revealing the information on the picture loss, and/or modifying a reconstructed version of the video, obtained by the decoding from the data stream, so as to provide the reconstructed version of the video with an indication of phases during which the picture loss fulfills some criterion.

The method 120 may be performed by the video decoder 50. The method 120 may comprise any step performed by the video decoder 50 disclosed herein.

According to an embodiment of the invention, further is provided a computer program computer program having a program code for performing, when running on a computer, the method 100 (and optionally any method steps disclosed herein in combination with method 100).

According to an embodiment of the invention, further is provided a computer program computer program having a program code for performing, when running on a computer, the method 110 (and optionally any method steps disclosed herein in combination with method 110).

According to an embodiment of the invention, further is provided a computer program computer program having a program code for performing, when running on a computer, the method 120 (and optionally any method steps disclosed herein in combination with method 120).

Any of the computer programs disclosed herein (such as the computer programs for performing the methods 100, 110, and 120), may be stored on a non-transitory digital storage medium having the computer program stored thereon.

According to an embodiment of the invention, further is provided s data stream generated by a method for video encoding, the method comprising encoding frames of the video using intra coding and differential inter-frame coding (e.g., using intra-coding and differential inter-frame coding for the same frame when using gradual decoding refresh, or using only differential inter-frame coding; e.g., for one or more or all frames) into a data stream, measuring a quality loss resulting from coding loss, and signalling, as side information, information on the quality loss in the data stream. The data stream may be generated by any further method steps enclosed herein (e.g., with reference to the video encoder 10). A non-transitory digital storage medium may have the data stream stored thereon.

In an implementation of the invention, a compression codec (e.g., used by at least one of the video encoder 10 and video decoder 40 or 50 described herein) is used for a video transmission system between a computer and a display (with a display frame rate) connected, for example, over a bandwidth-limited Ethernet line. The compression codec may improve the quality of a static image content from frame to frame up to lossless display of the video (or up to a target video quality). For example, the video encoder may signal a (currently) reached video quality, allowing the decoder to indicate the user when or if a target video quality is reached. In order to be able to make a reliable diagnosis for an image assessment in the medical field, the quality of the image (or video) can be measured and signalled to a viewer on a receiver side, so that the risk of false diagnoses can be reduced.

At the same time, requirements for a necessary bandwidth for the transmission line can be reduced.

In the third edition of JPEG XS, which is under standardization in 2023, a temporal differential prediction is proposed to improve screen content coding or coding of static backgrounds. The video decoder includes a frame buffer and receives either intra frame coded data or inter frame coded data (residual). In contrast to MPEG standards with fixed I-P-B coding JPEG XS uses a different mechanism called gradual refresh, where continuously a very small part (e.g., one or more sub-frame portions 32) of the image (e.g., frame 14) is refreshed (intra-coded) and the rest of the image is only updated (e.g., differentially inter-frame coded), which means a difference of a frame buffer content to the original image (in the case of JPEG XS in the wavelet-domain) is transmitted. This allows reducing the data rate dramatically, but potentially at the cost of a worse video quality at the first frame and an iterative improving image quality (similar like a frame-to-frame progressive coding system) for static content. The update mechanism (e.g., differentially inter-frame coded) may improve the image quality for static images gradually in the frame buffer up to the original image. An example related to continuously improved quality was demonstrated in the SMPTE paper [3]. The effect of continuously improving image quality can be exemplarily seen in FIG. 5*b*. Some of the algorithms may improve the image quality up to infinity, such as the filled rectangle curve 68 up to a frame number 20 (120 dB is the cap for displaying the quality in the diagram of FIG. 5*b*, but can go to infinity). The quality may drop down, if some movement appears in the image sequence.

The proposed invention may be implemented in a system with a encoder which encodes an uncompressed image with a frame-to-frame progressive coding system that can reproduce a defined high quality or mathematically lossless quality on the decoder side, a bandwidth limited transmission line (which may optionally comprise wireless transmission), and a decoder which can improve iteratively the image quality (e.g., using differential inter-frame coding) for static content while transmitting a video or image sequence at display frame rate. This is combined with a signalling mechanism, where it is, for example, signalled if the presented image reached a specific quality threshold (e.g. the dashed line 66 in FIG. 5*b*) or even mathematically lossless quality. This may be beneficial especially for medical applications where the doctor assesses medical images. Typically, the doctor needs at least some seconds to evaluate the image. In the first frames after displaying a new presented image, the decoded image might not have the necessary quality, but this is not important as a human cannot evaluate the image at the display frame rate. After a short time the required quality is reached. The signalling of the reached quality can be done either e.g. directly on the display by a red/green light or externally on a separate device (e.g., a device for optical, acoustical or haptic feedback).

In an exemplary embodiment, the quality measurement can be combined with quality characteristics of the display (e.g., having a maximum displayable video quality and/or having a frame rate dependent video quality). For example, the signalling can be performed not only dependent of a codec quality but also when the combined quality of the decoded image and the monitor reaches a defined quality.

That is, the following has been presented above:

1. A system for transmitting a video to a display at display frame rate with a compression unit at the sender side, which encodes an uncompressed image with a frame-to-frame progressive coding system that can reach a defined high quality or mathematically lossless quality on the decoder side after some frames for static images, a bandwidth limited transmission line, and a decoder unit at the display side which improves the image quality of static image content from frame to frame. It is combined with a signalling mechanism on the decoder side which indicates if a specific quality is reached.
2. The system can be applied for medical images to assure lossless quality is reached.
3. The signalling system can combine the decoded image quality with the monitor quality to signal the reached overall quality.

Implementation Alternatives

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

SOURCES

[1] ISO/IEC DIS 21122-1 Ed. 3, Information technology—JPEG XS low-latency lightweight image coding system—Part 1: Core coding system
[2] IEC 62563-2 ("Medical electrical equipment—Medical image display systems—Part 2: Acceptance and constancy tests for medical image displays")
[3] AAPM On-Line Report No. 03 ("Assessment of Display Performance for Medical Imaging Systems")
[4] S. Foessel and T. Richter, "Proposed Extensions to the Third Edition of JPEG XS (ISO/IEC 21122) Standard," in SMPTE Motion Imaging Journal, vol. 132, no. 4, pp. 26-32, May 2023, doi: 10.5594/JMI.2023.3261399.

The invention claimed is:

1. A video encoder for encoding a video, the video encoder comprising a processor configured to
    encode frames of the video using intra coding and differential inter-frame coding into a data stream,
    perform the differential inter-frame coding by subtraction in a transform domain between a current frame and a previously coded frame at a mutually undisplaced manner,
    measure a quality loss resulting from coding loss, and
    signal, as side information, information on the quality loss in the data stream.
2. The video encoder of claim 1, configured to
    perform the measuring and the signaling at a spatial granularity corresponding to frames or sub-frame portions; and/or
    wherein the video encoder is configured to
    perform the measuring and the signaling at a temporal granularity corresponding to a frame rate of the video.
3. The video encoder of claim 1, configured to
    measure the quality loss by determining an average of a per-pixel deviation measure between an undistorted version of the video and a reconstructable version as reconstructable from the data stream.

4. The video encoder of claim 1, configured to perform the encoding of the frames in the transform domain and measure the quality loss by averaging over transform coefficients of the transform domain.

5. The video encoder of claim 1, configured to signal the information on the quality loss as a binary information having two states, a first one of which corresponds to sufficient quality and a second one of which corresponds to insufficient quality, wherein sufficient quality and insufficient quality are indicative of the quality loss meeting one or more criteria having a threshold, or by use of an integer number or floating point scale.

6. The video encoder of claim 1, configured to perform the differential inter-frame coding by subtraction between a current frame and a previously coded frame to obtain a difference and coding the difference into the data stream.

7. The video encoder of claim 1, configured to use gradual decoding refresh so as to spatially re-position, from frame to frame, an intra-coded portion of the frames of the video over a frame area with coding portions of the frames, and, external to the intra-coded portion, use differential inter-frame coding.

8. The video encoder of claim 7, configured to encode the frames of the video using a bitrate control according to which a constant bitrate is obeyed at units of sub-frame portions into which the frame area is partitioned.

9. A video decoder for decoding a video, the video decoder comprising a processor configured to decode frames of the video using intra decoding and differential inter-frame decoding from a data stream, perform the differential inter-frame decoding by addition in a transform domain between a current frame and a previously coded frame at a mutually undisplaced manner, and derive, from side information of the data stream, information on a quality loss resulting from coding loss at which the video is encoded into the data stream.

10. The video decoder of claim 9, configured to derive the information on the quality loss from the data stream at a spatial granularity corresponding to frames or sub-frame portions; and/or wherein in the video decoder is configured to derive the information on the quality loss from the data stream at a temporal granularity corresponding to a frame rate of the video.

11. The video decoder of claim 9, wherein information on the quality loss is indicative of an average of a per-pixel deviation measure between an undistorted version of the video and a reconstructable version as reconstructable from the data stream.

12. The video decoder of claim 9, configured to derive the information on the quality loss from the data stream as a binary information having two states, a first one of which corresponds to sufficient quality and a second one of which corresponds to insufficient quality, wherein sufficient quality and insufficient quality are indicative of the quality loss meeting one or more criteria having a threshold, or by use of an integer number or floating point scale.

13. The video decoder of claim 9, configured to perform the differential inter-frame decoding by decoding, from the data stream, a difference between a current frame and a previously decoded frame and performing an addition between the difference and the previously decoded frame.

14. The video decoder of claim 13, configured to decode, from the data stream, the difference between the current frame and the immediately preceding frame in the transform domain, perform the addition in the transform domain to obtain a transform of the current frame and subject the transform to a re-transformation.

15. The video decoder of any of claim 9, configured to use gradual decoding refresh so as to spatially re-position, from frame to frame, an intra-decoded portion of the frames of the video over a frame area with decoding portions of the frames, and, external to the intra-decoded portion, use differential inter-frame decoding.

16. The video decoder of claim 9, configured to output, at an output interface of the video decoder, meta data revealing the information on the quality loss, and/or modify a reconstructed version of the video, obtained by the decoding from the data stream, so as to provide the reconstructed version of the video with an indication of phases during which the quality loss fulfills some criterion.

17. A video decoder for decoding a video, the video decoder comprising a processor configured to decode frames of the video using intra decoding and differential inter-frame decoding from a data stream into which the video is encoded at a coding loss, perform the differential inter-frame decoding by addition in a transform domain between a current frame and a previously coded frame at a mutually undisplaced manner, estimate information on a quality loss resulting from the coding loss, and output, at an output interface of the video decoder, meta data revealing the information on the quality loss, and/or modify a reconstructed version of the video, obtained by the decoding from the data stream, so as to provide the reconstructed version of the video with an indication of phases during which the quality loss fulfills some criterion.

18. The video decoder of claim 17, configured to estimate the information on the quality loss resulting from coding loss at which the video is encoded into the data stream based on an average level or average energy of a non-refreshed frame portion, or a combination of an average level or average energy of a non-refreshed frame portion of a frame for which the information on the quality loss is to be estimated and an average level or average energy of a co-located non-refreshed frame portion of a subsequent frame following, or preceding frame preceding the frame for which the information on the quality loss is to be estimated, wherein the co-located non-refreshed frame portion is co-located to a refreshed portion of the frame for which the information on the quality loss is to be estimated.

19. The video decoder of claim 18, configured to output, at the output interface of the video decoder, as the meta data revealing the information on the quality loss, a binary information whether the quality loss meets a predetermined quality minimum level, with setting the binary information to indicate that the quality loss meets the predetermined quality minimum level if the average level or average energy falls below a predetermined threshold, or modify the reconstructed version of the video, obtained by the decoding from the data stream, so as to provide the reconstructed version of the video with the indication of phases during which the quality loss fulfills some criterion in such a manner that the indication provides a binary information whether the quality loss meets a predetermined quality minimum level, so that the quality loss is indicated to meet the predetermined quality minimum level if the average level or average energy falls below a predetermined threshold.

20. The video decoder of claim 17, configured to perform the differential inter-frame decoding by decoding, from the data stream, a difference between a current frame and a previously decoded frame and performing an addition between the difference and the previously decoded frame.

21. The video decoder of claim 20, configured to decode, from the data stream, the difference between the current frame and the immediately preceding frame in the transform domain, perform the addition in the transform domain to obtain a transform of the current frame and subject the transform to a re-transformation.

22. The video decoder of claim 17, configured to use gradual decoding refresh so as to spatially re-position, from frame to frame, an intra-decoded portion of the frames of the video over a frame area with decoding portions of the frames, and, external to the intra-decoded portion, use differential inter-frame decoding.

23. A system comprising a video encoder for encoding a video, the video encoder comprising a processor configured to encode frames of the video using intra coding and differential inter-frame coding into a data stream, perform the differential inter-frame coding by subtraction in a transform domain between a current frame and a previously coded frame at a mutually undisplaced manner, and measure a quality loss resulting from coding loss, and signal, as side information, information on the quality loss; and a video decoder for decoding the video, the video decoder comprising a processor configured to decode frames of the video using intra decoding and differential inter-frame decoding from a data stream, perform the differential inter-frame decoding by addition in a transform domain between a current frame and a previously coded frame at a mutually undisplaced manner, and derive, from side information of the data stream, the information on a quality loss resulting from coding loss at which the video is encoded into the data stream.

24. A system comprising a video encoder comprising a processor configured to encode frames of the video using intra coding and differential inter-frame coding into a data stream, and perform the differential inter-frame coding by subtraction in a transform domain between a current frame and a previously coded frame at a mutually undisplaced manner; and a video decoder for decoding the video, the video decoder comprising a processor configured to decode frames of the video using intra decoding and differential inter-frame decoding from a data stream into which the video is encoded at a coding loss, perform the differential inter-frame decoding by addition in the transform domain between a current frame and a previously coded frame at a mutually undisplaced manner, estimate information on a quality loss resulting from the coding loss, and output, at an output interface of the video decoder, meta data revealing the information on the quality loss, and/or modify a reconstructed version of the video, obtained by the decoding from the data stream, so as to provide the reconstructed version of the video with an indication of phases during which the quality loss fulfills some criterion.

25. A system comprising a video decoder for decoding a video, the video decoder comprising a processor configured to decode frames of the video using intra decoding and differential inter-frame decoding from a data stream, perform the differential inter-frame decoding by addition in a transform domain between a current frame and a previously coded frame at a mutually undisplaced manner, and derive, from side information of the data stream, the information on a quality loss resulting from coding loss at which the video is encoded into the data stream;

or a video decoder for decoding a video, the video decoder comprising a processor configured to decode frames of the video using intra decoding and differential inter-frame decoding from a data stream into which the video is encoded at a coding loss, perform the differential inter-frame decoding by addition in the transform domain between a current frame and a previously coded frame at a mutually undisplaced manner, and estimate information on a quality loss resulting from the coding loss, and output, at an output interface of the video decoder, meta data revealing the information on the quality loss, and/or modify a reconstructed version of the video, obtained by the decoding from the data stream, so as to provide the reconstructed version of the video with an indication of phases during which the quality loss fulfills some criterion;

wherein the system further comprises a display for displaying a reconstructed video derived by the video decoder by decoding.

26. The system of claim 25, wherein the display is configured to modify the reconstructed version of the video so as to present the reconstructed version of the video modified with an indication of phases during which the quality loss fulfills some criterion; and/or wherein the display is configured to modify the reconstructed version of the video so as to present the reconstructed version of the video modified with an indication of phases of picture invariance.

27. A method for encoding a video, the method being performed by a processor and comprising encoding frames of the video using intra coding and differential inter-frame coding into a data stream, performing the differential inter-frame coding by subtraction in a transform domain between a current frame and a previously coded frame at a mutually undisplaced manner, measuring a quality loss resulting from coding loss, and signaling, as side information, information on the quality loss in the data stream.

28. A method for decoding a video, the method being performed by a processor and comprising decoding frames of the video using intra decoding and differential inter-frame decoding from a data stream, performing the differential inter-frame decoding by addition in a transform domain between a current frame and a previously coded frame at a mutually undisplaced manner, and deriving, from side information of the data stream, information on a quality loss resulting from coding loss at which the video is encoded into the data stream.

29. A method for decoding a video, the method being performed by a processor and comprising decoding frames of the video using intra decoding and differential inter-frame decoding from a data stream into which the video is encoded at a coding loss, perform the differential inter-frame decoding by addition in a transform domain between a current frame and a previously coded frame at a mutually undisplaced manner, estimating information on a quality loss resulting from the coding loss, and outputting, at an output interface of the video decoder, meta data revealing the information on the quality loss, and/or modifying a reconstructed version of the video, obtained by the decoding from the data stream, so as to provide the reconstructed version of the video with an indication of phases during which the quality loss fulfills some criterion.

\* \* \* \* \*